(12) United States Patent
Gormley

(10) Patent No.: US 12,709,400 B2
(45) Date of Patent: Aug. 18, 2026

(54) MOUNTING STRUCTURE FOR NACELLE INNER STRUCTURE

(71) Applicant: Rohr, Inc., Chula Vista, CA (US)

(72) Inventor: Timothy Gormley, Bonita, CA (US)

(73) Assignee: Rohr, Inc., Chula Vista, CA (US)

( * ) Notice: Subject to any disclaimer, the term of this patent is extended or adjusted under 35 U.S.C. 154(b) by 107 days.

(21) Appl. No.: 18/931,899

(22) Filed: Oct. 30, 2024

(65) Prior Publication Data

US 2026/0116560 A1 Apr. 30, 2026

(51) Int. Cl.

*B64D 29/00* (2006.01)
*B64D 27/40* (2024.01)
*F02K 3/06* (2006.01)

(52) U.S. Cl.

CPC ........... *B64D 29/00* (2013.01); *B64D 27/402* (2024.01); *F02K 3/06* (2013.01); *F05D 2220/323* (2013.01)

(58) Field of Classification Search

CPC .............................. B64D 29/00; B64D 27/402
See application file for complete search history.

(56) References Cited

U.S. PATENT DOCUMENTS 4,037,809 A * 7/1977 Legrand ................ B64D 27/18 244/54
4,044,973 A 8/1977 Moorehead
4,474,346 A * 10/1984 Murphy ................ B64D 29/00 60/797
4,585,189 A 4/1986 Buxton
5,157,915 A * 10/1992 Bart ...................... F01D 25/243 244/54
5,350,136 A * 9/1994 Prosser .................. B64D 29/08 244/129.4
5,369,954 A * 12/1994 Stuart ....................... F02K 1/52 239/265.17
5,467,941 A 11/1995 Chee
5,524,847 A 6/1996 Brodell
9,518,534 B2 12/2016 Kusel
9,784,214 B2 10/2017 Gormley
9,885,253 B2 2/2018 Soria
10,655,564 B2 5/2020 Gormley
10,794,328 B2 10/2020 Gormley
10,858,956 B2 12/2020 Peace
11,427,341 B2 8/2022 Pretty
11,511,874 B2 11/2022 Pretty
11,512,641 B2 * 11/2022 Boileau ..................... F02K 1/72

(Continued)

*Primary Examiner* — Brian M O'Hara
(74) *Attorney, Agent, or Firm* — Getz Balich LLC

(57) ABSTRACT

An assembly is provided for an aircraft propulsion system. This assembly includes a stationary structure, a nacelle inner barrel, a nacelle outer structure, a bifurcation and a mounting yoke. The stationary structure extends axially along an axis. The bifurcation includes a first bifurcation section and a second bifurcation section. The first bifurcation section is disposed to a first side of the stationary structure. The second bifurcation section is disposed to a second side of the stationary structure. The first and the second bifurcation sections each project radially out from the nacelle inner barrel to the nacelle outer structure. The mounting yoke is pivotally attached to the stationary structure at a radial outer end of the mounting yoke. The first bifurcation section is fixedly attached to a first side of the mounting yoke. The second bifurcation section is fixedly attached to a second side of the mounting yoke.

17 Claims, 16 Drawing Sheets

(56) References Cited

U.S. PATENT DOCUMENTS

| | | | |
|---|---|---|---|
| 11,548,653 | B2 | 1/2023 | Lacko |
| 11,624,339 | B2 | 4/2023 | Heau |
| 11,692,509 | B2 | 7/2023 | Gormley |
| 11,719,190 | B2 | 8/2023 | Gormley |
| 11,835,015 | B2 | 12/2023 | Gormley |
| 11,859,578 | B2 | 1/2024 | Chilukuri |

* cited by examiner 20
24,68
72
90
28
50
74
30
110
102
26
106A,118
88A
76
78
84
82,104
86
80

114,117A
70
176A
164A
174A
178
180A
170
172
192
182
188

166
168
190
178
186
182
180B
172
170
164B
174B
144
176B

MOUNTING STRUCTURE FOR NACELLE INNER STRUCTURE

BACKGROUND

1. Technical Field

This disclosure relates generally to an aircraft propulsion system and, more particularly, to a nacelle for the aircraft propulsion system.

2. Background Information

An aircraft propulsion system typically includes a nacelle providing an aerodynamic cover for a gas turbine engine. Various mounting arrangements are known in the art for the nacelle. While these known mounting arrangements have various benefits, there is still room in the art for improvement.

SUMMARY OF THE DISCLOSURE

According to an aspect of the present disclosure, an assembly is provided for an aircraft propulsion system. This assembly includes a stationary structure, a nacelle inner barrel, a nacelle outer structure, a bifurcation and a mounting yoke. The stationary structure extends axially along an axis. The nacelle inner barrel extends axially along and circumferentially about the axis. The nacelle outer structure extends axially along and circumferentially about the nacelle inner barrel. The bifurcation includes a first bifurcation section and a second bifurcation section. The first bifurcation section is disposed to a first side of the stationary structure. The second bifurcation section is disposed to a second side of the stationary structure that is circumferentially opposite to the first side of the stationary structure. The first bifurcation section and the second bifurcation section each project radially out from the nacelle inner barrel to the nacelle outer structure. The mounting yoke is pivotally attached to the stationary structure by a yoke pivot connection at a radial outer end of the mounting yoke. The first bifurcation section is fixedly attached to a first side of the mounting yoke. The second bifurcation section is fixedly attached to a second side of the mounting yoke that is circumferentially opposite to the second side of the mounting yoke.

According to another aspect of the present disclosure, another assembly is provided for an aircraft propulsion system. This assembly includes a stationary structure, a nacelle inner barrel, a nacelle outer structure, a bifurcation, a mounting yoke, a first yoke-to-inner barrel hinge and a second yoke-to-inner barrel hinge. The stationary structure extends axially along an axis. The nacelle inner barrel includes a first inner barrel section and a second inner barrel section. The first inner barrel section is disposed to a first side of the stationary structure. The second inner barrel section is disposed to a second side of the stationary structure that is circumferentially opposite to the first side of the stationary structure. The first inner barrel section and the second inner barrel section each extend axially along and circumferentially about the axis. The nacelle outer structure extends axially along and circumferentially about the nacelle inner barrel. The bifurcation projects radially out from the nacelle inner barrel to the nacelle outer structure. The bifurcation radially and axially covers the stationary structure. The mounting yoke is pivotally attached to the stationary structure by a yoke pivot connection at a radial outer end of the mounting yoke. The first yoke-to-inner barrel hinge is fixedly attached to the first inner barrel section and movably coupled to the mounting yoke at a radial inner end of the mounting yoke. The second yoke-to-inner barrel hinge is fixedly attached to the second inner barrel section and movably coupled to the mounting yoke at the radial inner end of the mounting yoke.

According to still another aspect of the present disclosure, another assembly is provided for an aircraft propulsion system. This assembly includes an engine case, a nacelle inner barrel, a nacelle outer structure, a bifurcation, a bifurcation mounting structure and an inner barrel mounting structure. The engine case extends axially along and circumferentially around an axis. The pylon structure is mounted to the engine case. The nacelle inner barrel includes a first inner barrel section and a second inner barrel section. The first inner barrel section is disposed to a first side of the pylon structure. The second inner barrel section is disposed to a second side of the pylon structure that is circumferentially opposite to the first side of the pylon structure. The first inner barrel section and the second inner barrel section each extend axially along and circumferentially about the engine case. The first inner barrel section is axially fixed to the engine case through a first inner barrel V-blade coupling. The second inner barrel section is axially fixed to the engine case through a second inner barrel V-blade coupling. The nacelle outer structure extends axially along and circumferentially about the nacelle inner barrel. The bifurcation includes a first bifurcation section and a second bifurcation section. The first bifurcation section is disposed to the first side of the pylon structure. The second bifurcation section is disposed to the second side of the pylon structure. The first bifurcation section and the second bifurcation section each project radially out from the nacelle inner barrel to the nacelle outer structure. The first bifurcation section is axially fixed to the engine case through a first bifurcation V-blade coupling. The second bifurcation section is axially fixed to the engine case through a second bifurcation V-blade coupling. The bifurcation mounting structure mounts the bifurcation to the pylon structure. The bifurcation mounting structure is operable to move relative to the nacelle inner barrel and the engine case. The inner barrel mounting structure is operable to move relative to the bifurcation mounting structure. The first inner barrel section and the second inner barrel section are each movably coupled to the inner barrel mounting structure through a plurality of hinges.

A bypass flowpath may extend radially between and may be formed by the nacelle inner barrel and the nacelle outer structure. The bifurcation may extend radially across and may circumferentially bifurcate the bypass flowpath.

A bypass flowpath may extend radially between and axially along the nacelle inner barrel and the nacelle outer structure. The bypass flowpath may extend circumferentially about the axis and circumferentially along the nacelle inner barrel and the nacelle outer structure from the first bifurcation section to the second bifurcation section.

The stationary structure may be a pylon structure for mounting the aircraft propulsion system to an aircraft airframe.

The assembly may include a gas turbine engine. The gas turbine engine may include a case, a compressor section, a combustor section and a turbine section. The case may house the compressor section, the combustor section and the turbine section. The nacelle inner barrel may extend axially along and circumferentially about the case. The stationary structure may be mounted to the case. The first bifurcation section may be axially fixed to the case through a first V-blade coupling. The second bifurcation section may be axially fixed to the case through a second V-blade coupling.

The mounting yoke may be a monolithic body.

The mounting yoke may include a first yoke bracket and a second yoke bracket. The first yoke bracket and the second yoke bracket may each be pivotally attached to the stationary structure by the yoke pivot connection. The first yoke bracket and the second yoke bracket may be bolted together at a radial inner end of the mounting yoke. The first bifurcation section may be fixedly attached to the first yoke bracket. The second bifurcation section may be fixedly attached to the second yoke bracket.

The nacelle inner barrel may include a first inner barrel section and a second inner barrel section. The assembly may also include a first yoke-to-inner barrel hinge and a second yoke-to-inner barrel hinge. The first yoke-to-inner barrel hinge may be fixedly attached to the first inner barrel section and movably coupled to the mounting yoke at a radial inner end of the mounting yoke. The second yoke-to-inner barrel hinge may be fixedly attached to the second inner barrel section and movably coupled to the mounting yoke at the radial inner end of the mounting yoke.

The assembly may also include a first yoke-to-hinge linkage and a second yoke-to-hinge linkage. The first yoke-to-hinge linkage may extend between and may be pivotally attached to the first yoke-to-inner barrel hinge and the mounting yoke. The second yoke-to-hinge linkage may extend between and may be pivotally attached to the second yoke-to-inner barrel hinge and the mounting yoke.

The assembly may also include a first bifurcation bracket and a second bifurcation bracket. The first bifurcation bracket may be pivotally attached to the stationary structure by a first bifurcation bracket pivot connection at a radial outer end of the first bifurcation bracket. The first bifurcation section may be fixedly attached to the first bifurcation bracket. The second bifurcation bracket may be pivotally attached to the stationary structure by a second bifurcation bracket pivot connection at a radial outer end of the second bifurcation bracket. The second bifurcation section may be fixedly attached to the second bifurcation bracket.

The bifurcation may extend axially from an upstream end of the bifurcation to a downstream end of the bifurcation. The first bifurcation bracket and the second bifurcation bracket may each be axially spaced from the mounting yoke towards the downstream end of the bifurcation.

The assembly may also include a lateral linkage extending between a first end of the lateral linkage and a second end of the lateral linkage. The lateral linkage may be pivotally attached to the first bifurcation bracket at the first end of the lateral linkage and a radial inner end of the first bifurcation bracket. The lateral linkage may be pivotally attached to the second bifurcation bracket at the second end of the lateral linkage and a radial inner end of the second bifurcation bracket.

The assembly may also include a diagonal linkage extending between a radial inner end of the diagonal linkage and a radial outer end of the diagonal linkage. The diagonal linkage may be pivotally attached to the lateral linkage at the radial inner end of the diagonal linkage and the first end of the lateral linkage. The diagonal linkage may be pivotally attached to the stationary structure at the radial outer end of the diagonal linkage and towards the second bifurcation bracket.

The nacelle inner barrel may include a first inner barrel section and a second inner barrel section. The assembly may also include a first bracket-to-inner barrel hinge and a second bracket-to-inner barrel hinge. The first bracket-to-inner barrel hinge may be fixedly attached to the first inner barrel section and movably coupled to the first bifurcation bracket at a radial inner end of the first bifurcation bracket. The second bracket-to-inner barrel hinge may be fixedly attached to the second inner barrel section and movably coupled to the second bifurcation bracket at a radial inner end of the second bifurcation bracket.

The assembly may also include a first bracket-to-hinge linkage and a second bracket-to-hinge linkage. The first bracket-to-hinge linkage may be pivotally attached to the first bracket-to-inner barrel hinge. The first bracket-to-hinge linkage may be attached to the first bifurcation bracket by a plurality of first bracket pin connections. The second bracket-to-hinge linkage may be pivotally attached to the second bracket-to-inner barrel hinge. The second bracket-to-hinge linkage may be attached to the second bifurcation bracket by a plurality of second bracket pin connections.

The nacelle inner barrel may include a first inner barrel section and a second inner barrel section. The assembly may also include a bumper structure fixedly attached to the stationary structure and decoupled from the bifurcation. The bumper structure may include a first bumper and a second bumper. The first bumper may be configured to abut against the first inner barrel section when the first inner barrel section is in a closed position. The first bumper may be configured to disengage from the first inner barrel section when the first inner barrel section is in an open position. The second bumper may be configured to abut against the second inner barrel section when the second inner barrel section is in a closed position. The second bumper may be configured to disengage from the second inner barrel section when the second inner barrel section is in an open position.

The nacelle inner barrel may include a first inner barrel section and a second inner barrel section. The assembly may also include a crossbar linkage, a first linkage-to-inner barrel hinge and a second linkage-to-inner barrel hinge. The crossbar linkage may extend between a first end of the crossbar linkage and a second end of the crossbar linkage. The first linkage-to-inner barrel hinge may be fixedly attached to the first inner barrel section and pivotally coupled to the crossbar linkage at the first end of the crossbar linkage. The second linkage-to-inner barrel hinge may be fixedly attached to the second inner barrel section and pivotally coupled to the crossbar linkage at the second end of the crossbar linkage.

The crossbar linkage may be decoupled from and disengaged from the stationary structure and the bifurcation.

The nacelle inner barrel may include a first inner barrel section and a second inner barrel section. The assembly may also include a gas turbine engine including a case, a compressor section, a combustor section and a turbine section. The case may house the compressor section, the combustor section and the turbine section. The nacelle inner barrel may extend axially along and circumferentially about the case. The stationary structure may be mounted to the case. The first inner barrel section may be axially fixed to the case through a first V-blade coupling. The second inner barrel section may be axially fixed to the case through a second V-blade coupling.

The present disclosure may include any one or more of the individual features disclosed above and/or below alone or in any combination thereof.

The foregoing features and the operation of the invention will become more apparent in light of the following description and the accompanying drawings.

DETAILED DESCRIPTION

Figure 1:
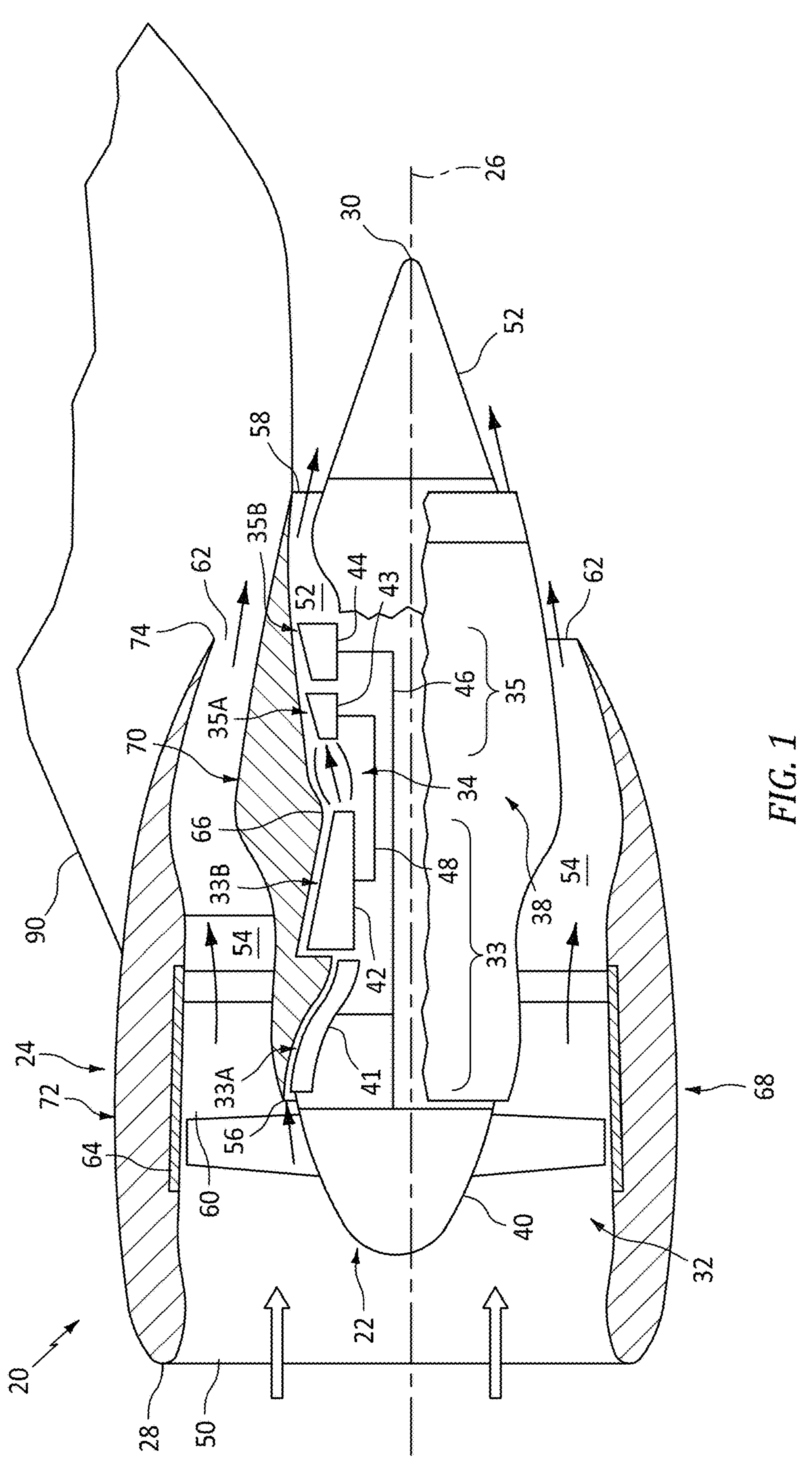
FIG. 1 is a schematic cutaway illustration of an aircraft propulsion system.

FIG. 1 illustrates an aircraft propulsion system 20 for an aircraft. The aircraft may be an airplane, a drone (e.g., an unmanned aerial vehicle (UAV)) or any other manned or unmanned aerial vehicle or system. The aircraft propulsion system 20 of FIG. 1 includes a gas turbine engine 22 and a housing structure 24.

The aircraft propulsion system 20 extends axially along an axis 26 from an upstream forward end 28 of the aircraft propulsion system 20 to a downstream aft end 30 of the aircraft propulsion system 20. Briefly, the axis 26 may be a centerline axis of the turbine engine 22, the housing structure 24 and/or, more generally, the aircraft propulsion system 20. The axis 26 may also or alternatively be a centerline axis and/or a rotational axis of one or more rotating members of the turbine engine 22.

The turbine engine 22 is configured to power operation of the aircraft propulsion system 20. For ease of description, the turbine engine 22 is generally described below as a turbofan engine such as a high-bypass turbofan engine. The turbine engine 22 of FIG. 1, for example, includes a fan section 32, a compressor section 33, a combustor section 34 and a turbine section 35. The compressor section 33 may include a low pressure compressor (LPC) section 33A and a high pressure compressor (HPC) section 33B. The turbine section 35 may include a high pressure turbine (HPT) section 35A and a low pressure turbine (LPT) section 35B. At least (or only) the LPC section 33A, the HPC section 33B, the combustor section 34, the HPT section 35A and the LPT section 35B may collectively form a core 38 (e.g., a gas generator) of the turbine engine 22. The present disclosure, however, is not limited to such an exemplary gas turbine engine nor to a gas turbine engine with a two-stage engine core.

Each of the engine sections 32-33A, 33B, 35A and 35B of FIG. 1 includes a respective bladed engine rotor 40-44. Each of these engine rotors 40-44 includes a plurality of rotor blades arranged circumferentially around and connected to one or more respective rotor disks or hubs. The fan rotor 40 and the LPC rotor 41 are connected to and driven by the LPT rotor 44 through a low speed shaft 46. The HPC rotor 42 is connected to and driven by the HPT rotor 43 through a high speed shaft 48. The engine shafts 46 and 48 are rotatably supported by a plurality of bearings (not shown). Each of these bearings is connected to the housing structure 24 by at least one stationary structure such as, for example, an annular support strut.

During operation, ambient air from outside of the aircraft enters the aircraft propulsion system 20 through an airflow inlet 50 at the forward end 28 of the aircraft propulsion system 20. This air is directed across the fan section 32 and into a core flowpath 52 and a bypass flowpath 54; e.g., a D-duct, C-duct or O-duct bypass flowpath. The core flowpath 52 extends longitudinally within the aircraft propulsion system 20, sequentially through the engine core 38 and its engine sections 33A-35B, from an airflow inlet 56 into the core flowpath 52 to a combustion products exhaust 58 from the core flowpath 52. The air entering the core flowpath 52 may be referred to as "core air". The bypass flowpath 54 bypasses (e.g., is radially outboard of and extends axially along) the engine core 38 and its members 33A-35B from an airflow inlet 60 into the bypass flowpath 54 to an airflow exhaust 62 from the bypass flowpath 54. The air within the bypass flowpath 54 may be referred to as "bypass air".

The core air is compressed by the LPC rotor 41 and the HPC rotor 42 and directed into a combustion chamber of a combustor in the combustor section 34. Fuel is injected into the combustion chamber and mixed with the compressed core air to provide a fuel-air mixture. This fuel air mixture is ignited and combustion products thereof flow through and sequentially drive rotation of the HPT rotor 43 and the LPT rotor 44. The rotation of the HPT rotor 43 and the LPT rotor 44 respectively drive rotation of the HPC rotor 42 and the LPC rotor 41 and, thus, compression of the air received from the core inlet 56. The rotation of the LPT rotor 44 also drives rotation of the fan rotor 40. This rotation of the fan rotor 40 propels bypass air through the bypass flowpath 54 and out of the aircraft propulsion system 20 through the bypass exhaust 62. The propulsion of the bypass air may account for a majority of thrust generated by the aircraft propulsion system 20.

The housing structure 24 is configured to house and/or support the turbine engine 22. The engine sections 32-35B of FIG. 1, in particular, are arranged sequentially along the axis 26 within the housing structure 24. The housing structure 24 of FIG. 1 includes an outer engine case 64 (e.g., a fan case, a containment case, etc.), an inner engine case 66 (e.g., a core case) and a nacelle 68.

The outer engine case 64 houses the fan section 32. More particularly, the outer engine case 64 is disposed radially outboard of and next to the fan rotor 40. This outer engine case 64 extends axially along and circumscribes the fan rotor 40 as well as a forward, upstream portion of an inner structure 70 of the nacelle 68. With this arrangement, the outer engine case 64 may form a forward portion of a radial outer peripheral boundary of the bypass flowpath 54.

The inner engine case 66 houses the engine core 38 and its engine sections 33A-35B. More particularly, the inner engine case 66 is disposed radially outboard, extends axially along and circumscribes each of the engine sections 33A-35B and their respective engine rotors 41-44.

Figures 2, 3:
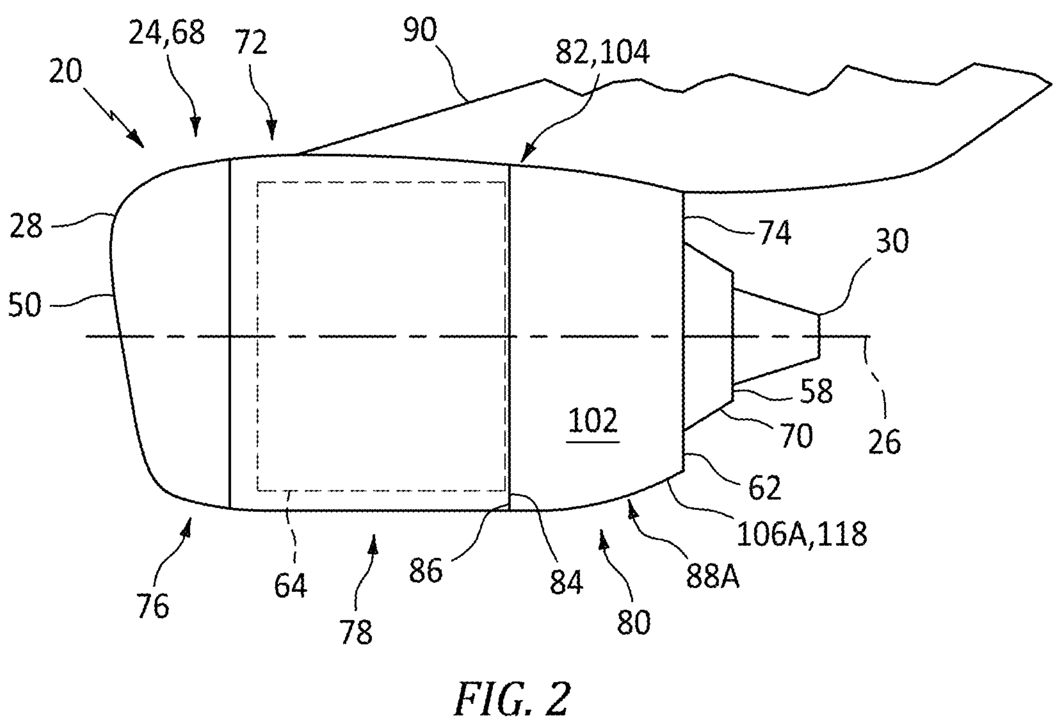
FIG. 2 is a side illustration of the aircraft propulsion system with a thrust reverser in a stowed position.
FIG. 3 is a side illustration of the aircraft propulsion system with the thrust reverser in a deployed position.

The nacelle 68 is configured to house and provide an aerodynamic cover for the turbine engine 22. Referring to FIG. 2, an outer structure 72 of the nacelle 68 (e.g., an outer fixed structure (OFS)) extends along the axis 26 from the propulsion system forward end 28 to a downstream aft end 74 of the nacelle outer structure 72. The nacelle outer structure 72 of FIG. 2 includes an inlet structure 76, one or more fan cowls 78 (one such fan cowl visible in FIG. 2) and an aft structure 80, which aft structure 80 is configured as part of or otherwise includes a thrust reverser 82 (see FIG. 3).

The inlet structure 76 is disposed at the propulsion system forward end 28. The inlet structure 76 forms a radial outer peripheral boundary of the airflow inlet 50 into the aircraft propulsion system 20. This inlet structure 76 is further configured to direct a stream of the ambient air through the airflow inlet 50 to the turbine engine 22 as described above; see also FIG. 1.

The fan cowls 78 are disposed axially between the inlet structure 76 and the aft structure 80. Each fan cowl 78 of FIG. 2, for example, is disposed at (e.g., on, adjacent or proximate) a downstream aft end 84 of a stationary portion of the nacelle 68, and extends axially forward to the inlet structure 76. Each fan cowl 78 is generally axially aligned with the fan section 32. The fan cowls 78 are configured to provide an aerodynamic covering over the outer engine case 64.

The term "stationary portion" is used above to describe a portion of the nacelle 68 that is stationary during aircraft propulsion system operation; e.g., during takeoff, aircraft flight and landing. However, the stationary portion may be otherwise movable for aircraft propulsion system inspection/maintenance; e.g., when the aircraft propulsion system 20 is non-operational. Each of the fan cowls 78, for example, may be configured to provide access to components of the turbine engine 22 such as the outer engine case 64 and/or peripheral equipment configured therewith for inspection, maintenance and/or otherwise. In particular, each fan cowl 78 may be pivotally mounted with the aircraft propulsion system 20 by, for example, a pivoting hinge system. Alternatively, the fan cowls 78 and the inlet structure 76 may be configured into a single axially translatable body for example. The present disclosure, of course, is not limited to the foregoing fan cowl configurations and/or access schemes.

The aft structure 80 is disposed at the outer structure aft end 74. The aft structure 80 of FIG. 2, for example, extends axially along the axis 26 from an upstream forward end 86 of the aft structure 80 to the outer structure aft end 74. The aft structure 80 is configured to partially form an aft portion of the radial outer peripheral boundary of the bypass flowpath 54; see also FIG. 1. The aft structure 80 is also configured to form the bypass exhaust 62 with the nacelle inner structure 70, which nacelle inner structure 70 houses the engine core 38.

Figure 4:
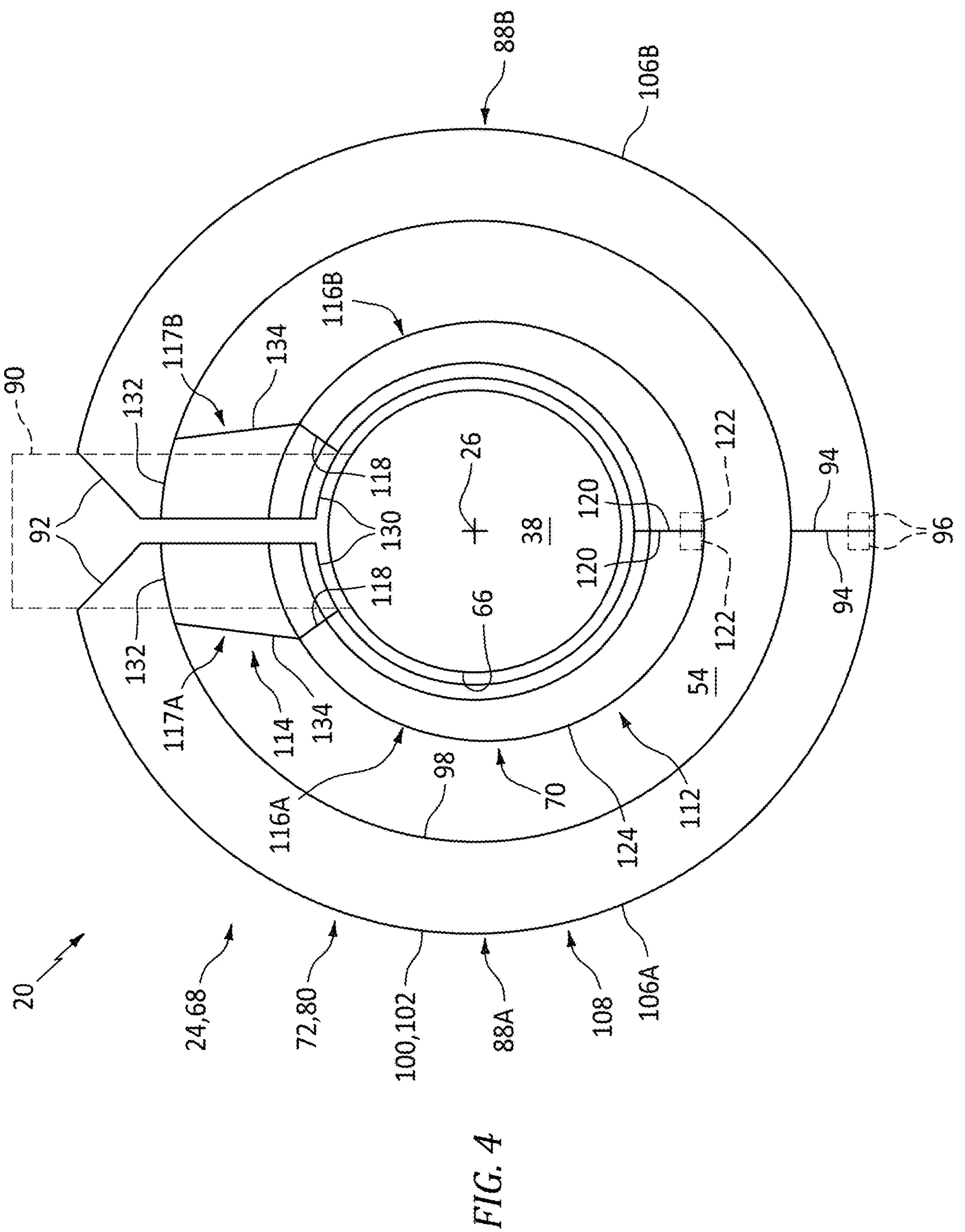
FIG. 4 is an end view illustration of the aircraft propulsion system with its pivotable structures in closed positions.

Referring to FIG. 4, the aft structure 80 includes a set of outer structure sections 88A and 88B (generally referred to as "88"); e.g., outer structure halves. These outer structure sections 88 are arranged laterally (e.g., circumferentially and/or tangentially) on opposing lateral sides of the aircraft propulsion system 20. More particularly, the outer structure sections 88 are arranged laterally to opposing lateral sides of a stationary structure 90 such as a pylon structure for mounting the aircraft propulsion system 20 to an airframe of the aircraft.

Figure 5:
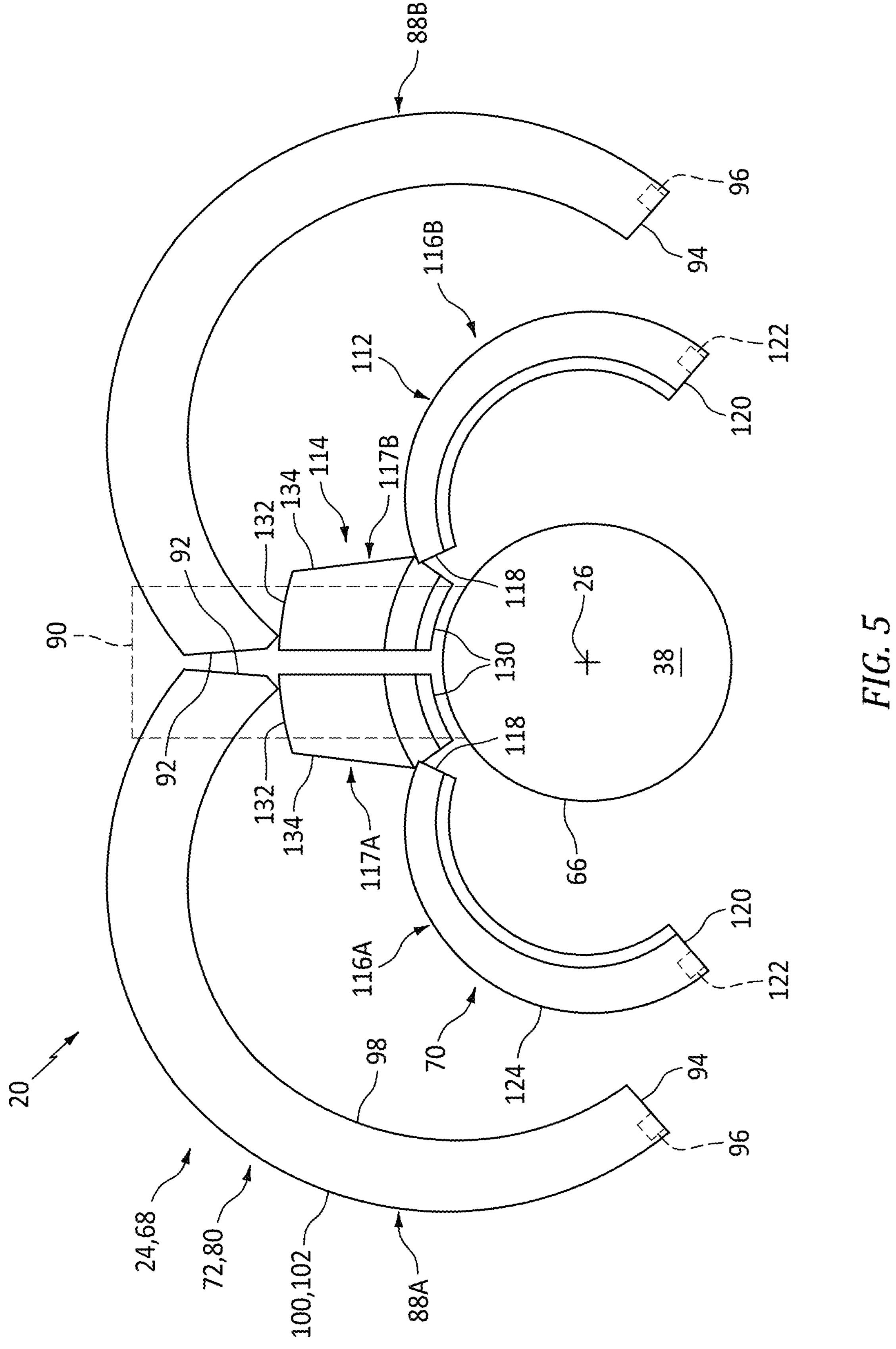
FIG. 5 is an end view illustration of the aircraft propulsion system with its pivotable structures in open positions.

Each of the outer structure sections 88 extends circumferentially about the axis 26 from a circumferential first end 92 (e.g., a top end) of the respective outer structure section 88 to a circumferential second end 94 (e.g., a bottom end) of the respective outer structure section 88. At the outer structure section first end 92, each outer structure section 88 may be pivotally and/or otherwise moveably coupled to the stationary structure 90. At the outer structure section second ends 94, the outer structure sections 88 are removably attached to one another by one or more outer structure latches 96. With such an arrangement, the outer structure sections 88 may collectively form a substantially annular body when the outer structure sections 88 are disposed in closed positions and attached together by the outer structure latches 96. Here, the annular outer structure body may extend circumferentially about the axis 26 at least, for example, three-hundred and thirty degrees (330°) or three-hundred and forty degrees (340°) between and to the opposing lateral sides of the stationary structure 90. However, when the outer structure latches 96 are unlatched to decouple the outer structure sections 88, each of the outer structure sections 88 may (e.g., independently) pivot and/or otherwise move from its closed position to an open position as shown, for example, in FIG. 5.

Each of the outer structure sections 88 of FIG. 4 extends radially from a radial inner side 98 of the respective outer structure section 88 to a radial outer side 100 of the respective outer structure section 88. Each outer structure section inner side 98 of FIG. 4 forms the radial outer peripheral boundary of a respective portion (e.g., downstream half) of the bypass flowpath 54. Each outer structure section outer side 100 of FIG. 4 forms an aerodynamic exterior surface 102 of the aircraft propulsion system 20 which is exposed to the ambient air in an environment external to the aircraft and its aircraft propulsion system 20.

Figure 6:
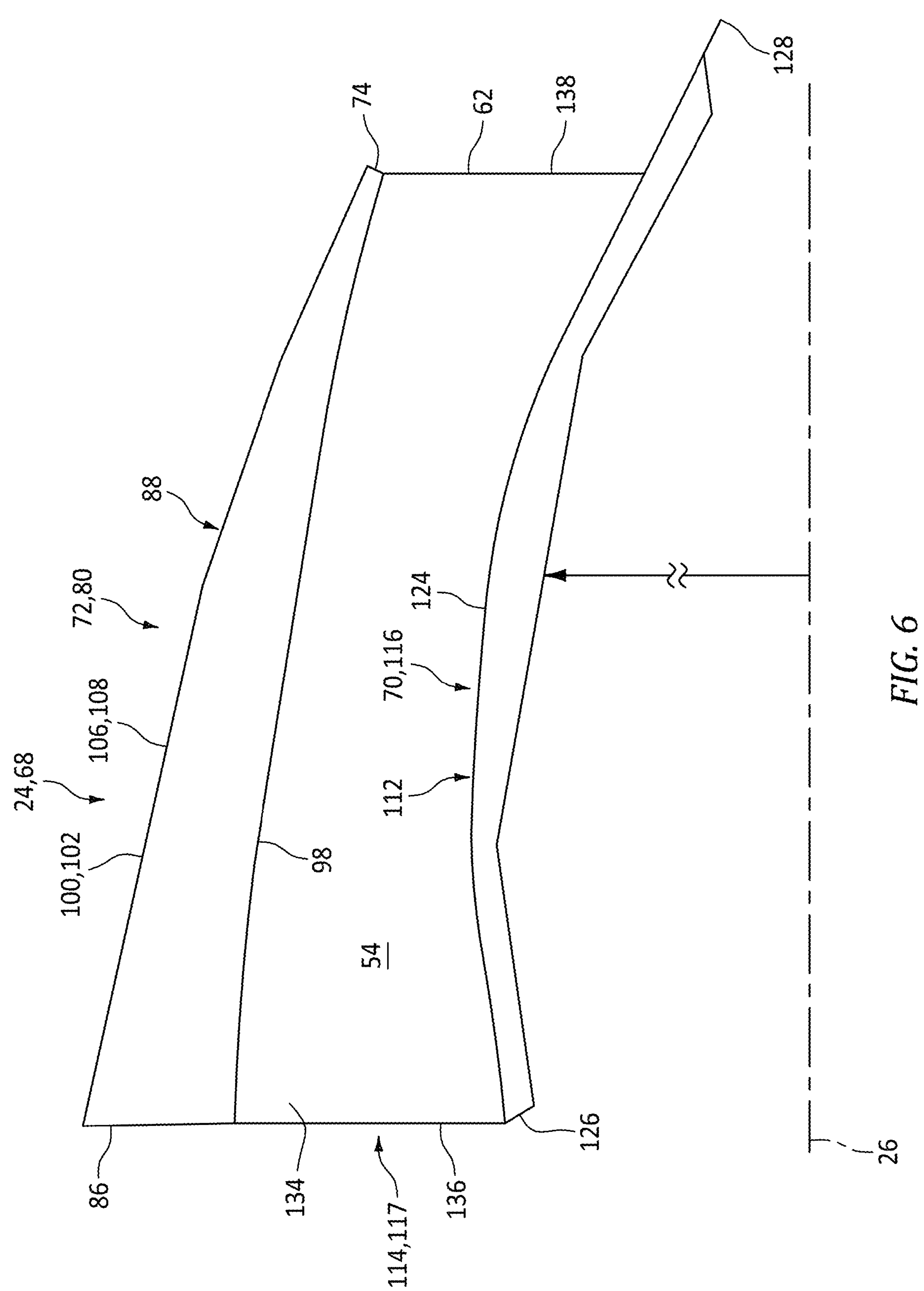
FIG. 6 is a partial schematic sectional illustration of the aircraft propulsion system.

Referring to FIG. 6, each of the outer structure sections 88 extends axially along the axis 26 from the aft structure forward end 86 to the outer structure aft end 74. Similarly, each exterior surface 102 extends axially along the axis 26 from an upstream forward end of the exterior surface 102 to the outer structure aft end 74. Here, the exterior surface forward end may be the same as the aft structure forward end 86.

Referring to FIG. 3, each outer structure section 88 may be configured with a section 104 (e.g., a half) of the thrust reverser 82. This thrust reverser section 104 includes a circumferential section 106A, 106B (generally referred to as "106") of a translating sleeve 108. Briefly, this sleeve section 106 includes/forms the respective exterior surface 102 and is configured to translate axially along the axis 26 between and to a forward stowed position (see FIG. 2) and an aft deployed position (see FIG. 3). In the forward stowed position of FIG. 2, the sleeve section 106 provides the functionality described above. In the aft deployed position of FIG. 3, the sleeve section 106 at least partially (or substantially completely) uncovers at least one or more other components of the thrust reverser section 104 such as, but not limited to, one or more cascade structures 110. In addition, as the sleeve section 106 moves from the stowed position to the deployed position, one or more blocker doors (not shown) arranged with the outer structure section 88 and its sleeve section 106 may be deployed to divert bypass air from the bypass flowpath 54 and through the cascade structures 110 to provide reverse thrust.

Referring to FIG. 4, the nacelle inner structure 70 includes an inner barrel 112 and a bifurcation 114; e.g., an upper bifurcation. The inner barrel 112 includes a set of inner barrel sections 116A and 116B (generally referred to as "116"); e.g., inner barrel halves. The bifurcation 114 includes a set of (e.g., upper) bifurcation sections 117A and 117B (generally referred to as "117"). As will become apparent in the description below, with the nacelle inner structure arrangement of FIG. 4, the bypass flowpath 54 is provided with an O-duct configuration. It is contemplated, however, the nacelle inner structure 70 may also include a lower bifurcation to provide the bypass flowpath 54 with a C-duct or a D-duct configuration in other embodiments.

The inner barrel sections 116 are arranged laterally on the opposing lateral sides of the aircraft propulsion system 20. More particularly, the inner barrel sections 116 are arranged laterally to the opposing lateral sides of the stationary structure 90.

Each of the inner barrel sections 116 extends circumferentially about the axis 26 from a circumferential first end 118 (e.g., a top end) of the respective inner barrel section 116 to a circumferential second end 120 (e.g., a bottom end) of the respective inner barrel section 116. At the inner barrel section first end 118, each inner barrel section 116 may be pivotally and/or otherwise moveably coupled to the stationary structure 90. At the inner barrel section second ends 120, the inner barrel sections 116 are removably attached to one another by one or more inner barrel latches 122. With such an arrangement, the inner barrel sections 116 may collectively form a substantially annular body when the inner barrel sections 116 are disposed in closed positions and attached together by the inner barrel latches 122. Here, the annular inner barrel body may extend circumferentially about the axis 26 at least, for example, three-hundred and ten degrees (310°) or three-hundred and twenty degrees (320°) between and to opposing lateral sides of the bifurcation 114. However, when the inner barrel latches 122 are unlatched to decouple the inner barrel sections 116, each of the inner barrel sections 116 may (e.g., independently) pivot and/or otherwise move from its closed position to an open position as shown, for example, in FIG. 5.

Each of the inner barrel sections 116 of FIG. 4 projects radially out to a radial outer side 124 of the respective inner barrel section 116. Each inner barrel section outer side 124 of FIG. 4 forms a radial inner peripheral boundary of a respective portion (e.g., downstream half) of the bypass flowpath 54. Referring to FIG. 6, each of the inner barrel sections 116 extends axially along the axis 26 from an upstream forward end 126 of the respective inner barrel section 116 to a downstream aft end 128 of the respective inner barrel section 116.

The bifurcation sections 117 of FIG. 4 are arranged laterally on the opposing lateral sides of the aircraft propulsion system 20. More particularly, the bifurcation sections 117 are arranged laterally to the opposing lateral sides of the stationary structure 90. Each of these bifurcation sections 117 is fixedly mounted to the stationary structure 90 such that the bifurcation 114 and its bifurcation sections 117 may remain stationary when one or more of the outer structure sections 88 and/or one or more of the inner barrel sections 116 is/are moved from the closed position(s) of FIG. 4 to the open position(s) of FIG. 5.

Each bifurcation section 117 projects radially out from a radial inner side 130 of the respective bifurcation section 117 to a radial outer side 132 of the respective bifurcation section 117. The bifurcation section inner side 130 is disposed next to a respective one of the inner barrel sections 116 at its inner barrel section first end 118. The bifurcation section outer side 132 is disposed next to a respective one of the outer structure sections 88 at its outer structure section first end 92. Each bifurcation section 117 projects laterally to a lateral side 134 of the respective bifurcation section 117. This bifurcation section lateral side 134 of FIG. 4 forms a lateral peripheral boundary of the bypass flowpath 54. Referring to FIG. 6, each bifurcation section 117 extends axially along the axis 26 from an upstream forward end 136 of the respective bifurcation section 117 to a downstream aft end 138 of the respective bifurcation section 117.

With the nacelle inner barrel arrangement of FIG. 4, the bifurcation 114 projects radially across and bifurcates at least the aft portion of the bypass flowpath 54. The bypass flowpath 54 of FIG. 4 thereby extends circumferentially about the axis 26, along the nacelle inner structure 70 and its inner barrel sections 116 as well as the nacelle outer structure 72 and its outer structure sections 88, between and to the opposing lateral sides 134 of the bifurcation 114 and its bifurcation sections 117. The bifurcation 114 and its bifurcation sections 117 thereby form respective circumferential sides of the bypass flowpath 54 of FIG. 4. This bypass flowpath 54 of FIG. 4 also extends radially between and to (a) the nacelle inner structure 70 and its inner barrel sections 116 and (b) the nacelle outer structure 72 and its outer structure sections 88. However, as discussed above, the present disclosure is not limited to such an exemplary O-duct bypass flowpath arrangement.

Figure 7:
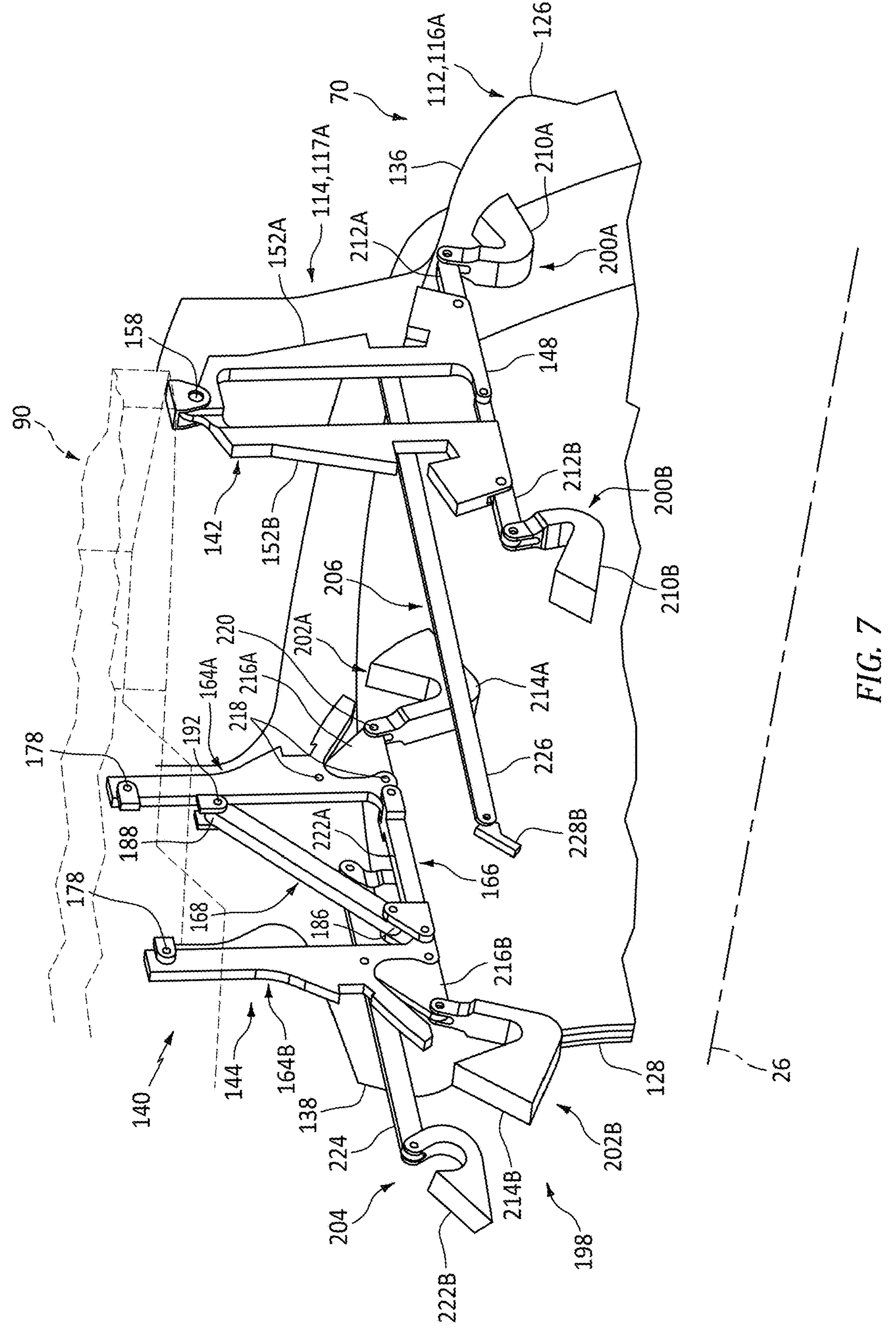
FIG. 7 is a perspective illustration of a portion of a nacelle inner structure with multiple mounting structures.
Figure 8:
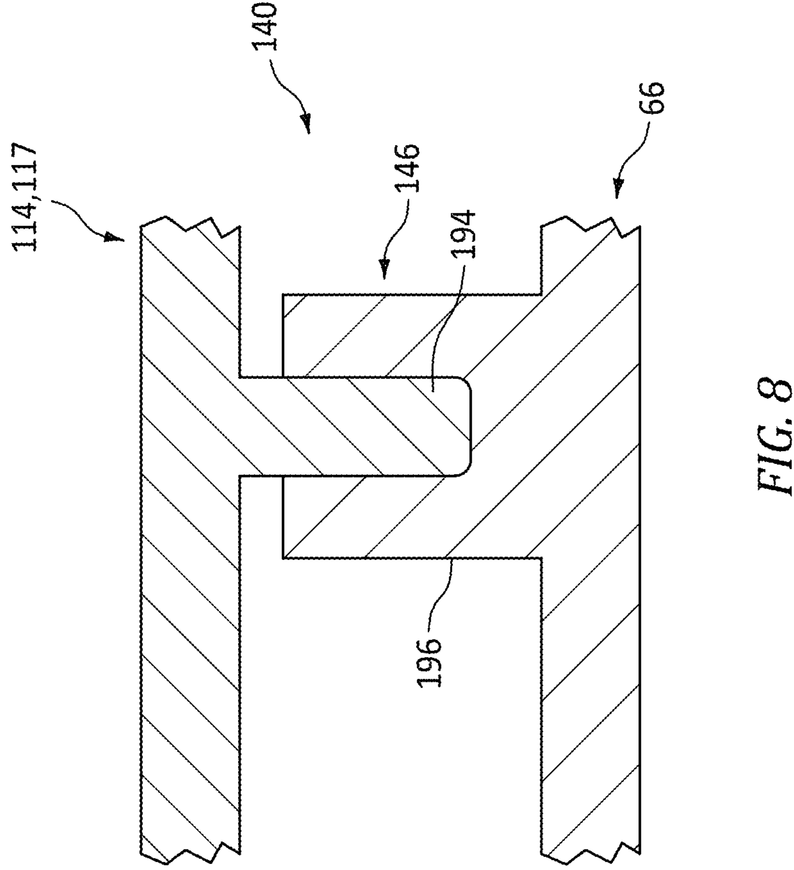
FIG. 8 is a partial sectional illustration of a V-blade coupling between a bifurcation section and an inner engine case.

Referring to FIG. 7, the bifurcation 114 and each of its bifurcation sections 117 is mounted with the aircraft propulsion system using a bifurcation mounting structure 140. This bifurcation mounting structure 140 is configured to mount the bifurcation 114 and each of its bifurcation sections 117 to the stationary structure 90 as well as the inner engine case 66 (see FIG. 8). The bifurcation mounting structure 140 of FIG. 7 includes a mounting yoke 142 and a mounting truss 144, where the mounting yoke 142 of FIG. 7 is axially forward of the mounting truss 144 along the bifurcation 114. Referring to FIG. 8, the bifurcation mounting structure 140 may also include a bifurcation V-blade coupling 146 (or other tongue and groove coupling) for each bifurcation section 117. Each bifurcation V-blade coupling 146 may be axially forward of the mounting truss 144 and the mounting yoke 142 along the bifurcation 114 (see FIG. 7).

Figure 9:
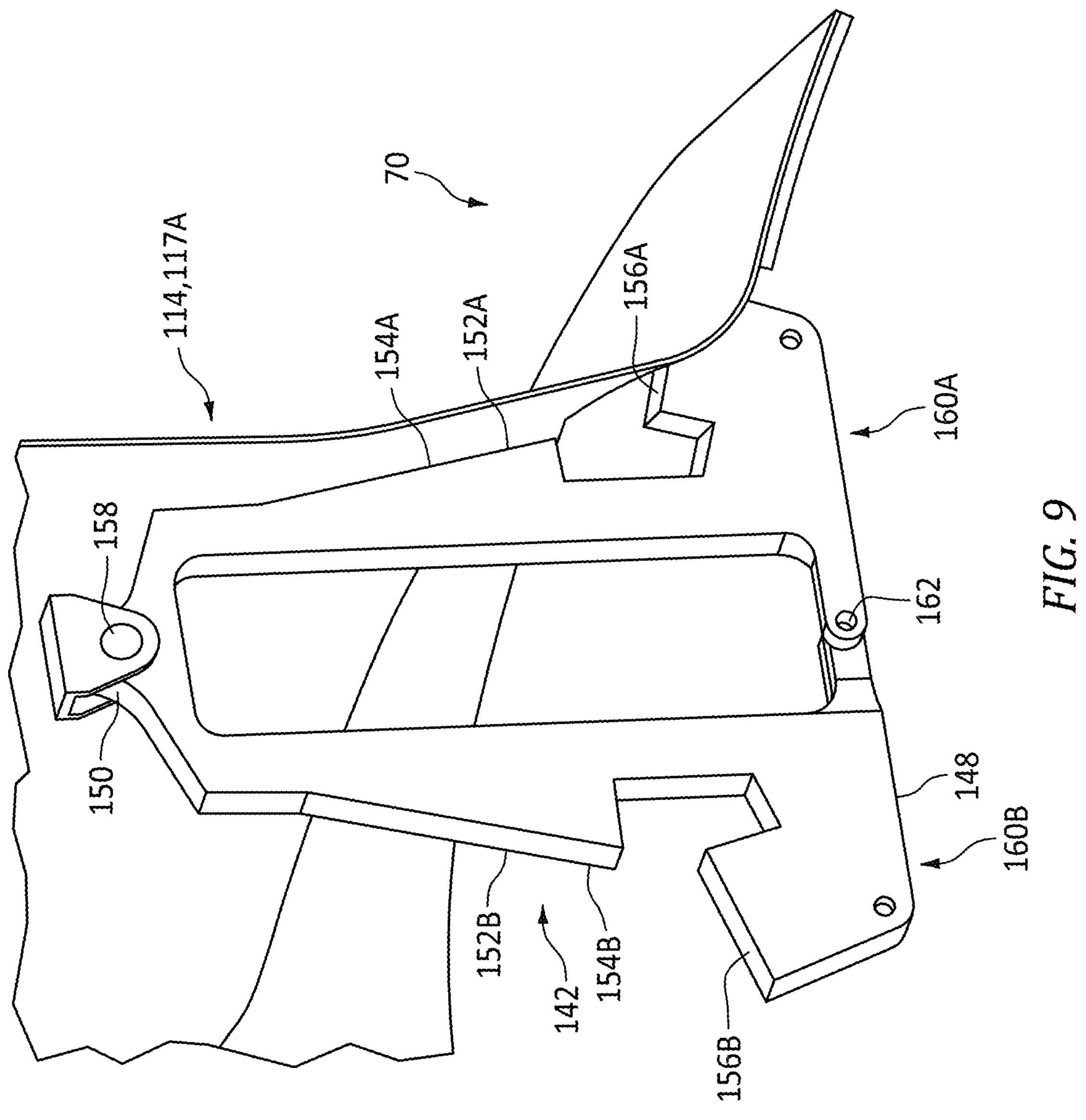
FIG. 9 is a perspective illustration of a portion of the nacelle inner structure with a mounting yoke.

Referring to FIG. 9, the mounting yoke 142 extends radially from a radial inner end 148 of the mounting yoke 142 to a radial outer end 150 of the mounting yoke 142. The mounting yoke 142 extends laterally between and to opposing lateral sides 152A and 152B (generally referred to as "152") of the mounting yoke 142. At each yoke side 152A, 152B, the mounting yoke 142 includes one or more bifurcation lands 154A, 154B (generally referred to as "154") and 156A, 156B (generally referred to as "156"). Each of these bifurcation lands 154 and 156 is configured to engage (e.g., abut against, contact, etc.) a back side of a respective one of the bifurcation sections 117. Each bifurcation section 117 is also fixedly attached to the mounting yoke 142 at the respective bifurcation lands 154 and 156. Each bifurcation section 117, for example, may be mechanically fastened (e.g., riveted, bolted, etc.) and/or bonded (e.g., welded, brazed, adhered, etc.) to one or all of the respective bifurcation lands 154 and 156. The mounting yoke 142 is also attached to the stationary structure 90 (see FIG. 7), thereby providing a coupling between the bifurcation 114 and each of its bifurcation sections 117 and the stationary structure 90. More particularly, the mounting yoke 142 of FIG. 7 is pivotally attached to the stationary structure 90 through a yoke pivot connection 158 (e.g., a single pin connection via a spherical or plain bearing arrangement) at the yoke outer end 150. This pinned connection may translate axially along the axis of the pin, which axial translation may be in the direction of the axis 26. With this arrangement, the mounting yoke 142 is operable to pivot about a pivot axis of the yoke pivot connection 158 relative to the stationary structure 90. The mounting yoke 142 thereby moveably couples an upstream forward portion of the bifurcation 114 and its bifurcation sections 117 to the stationary structure 90. This mounting yoke 142 also provides a rigid backbone for the forward portion of the bifurcation 114 and its bifurcation sections 117.

Figure 10:
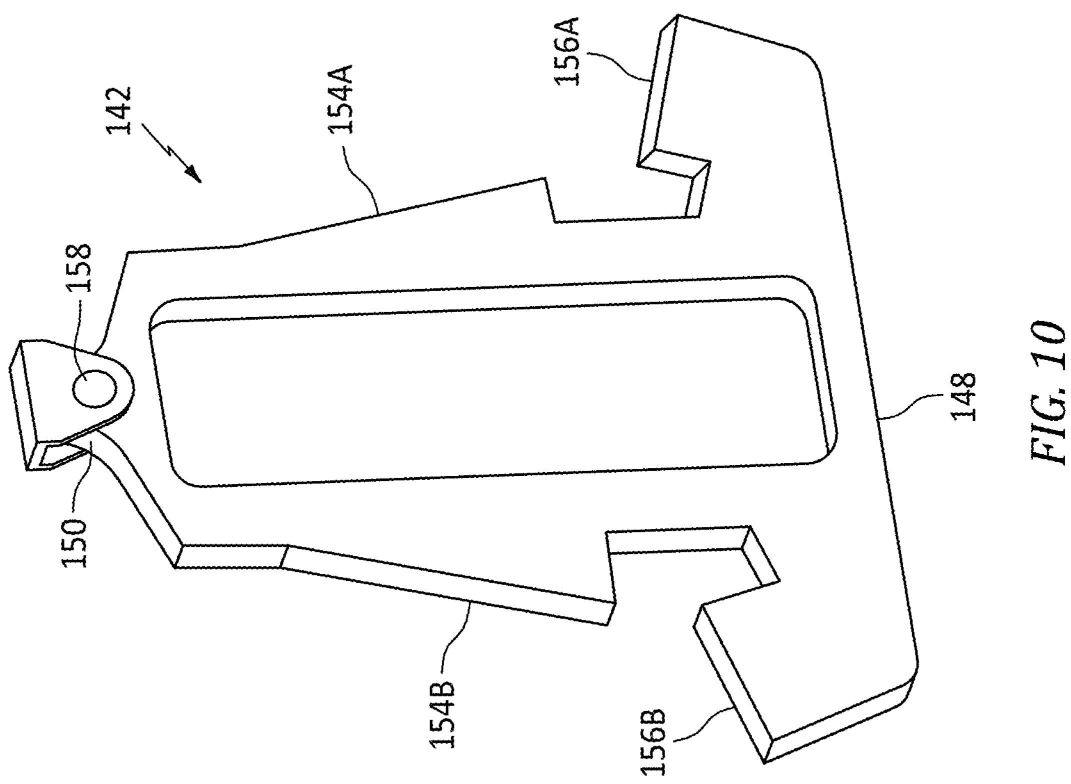
FIG. 10 is a perspective illustration of the mounting yoke having a monolithic body.

The mounting yoke 142 of FIG. 9 includes a first yoke bracket 160A and a second yoke bracket 160B. These yoke brackets 160A and 160B (generally referred to as "160") may each form one-half of the mounting yoke 142. Each yoke bracket 160 of FIG. 9, for example, includes the bifurcation lands 154 and 156 to a common side 152 of the mounting yoke 142. At the yoke outer end 150, each of the yoke brackets 160 may be coupled to the stationary structure 90 (see FIG. 7) through the same yoke pivot connection 158. At the yoke inner end 148, the yoke brackets 160 may be attached together by a bolted connection 162. The present disclosure, however, is not limited to such an exemplary multi-piece mounting yoke. The mounting yoke 142 of FIG. 10, for example, is configured as a monolithic body. The mounting yoke 142 of FIG. 10, for example, may be cast, machined, additively manufactured and/or otherwise formed as a single, unitary body.

Figure 11:
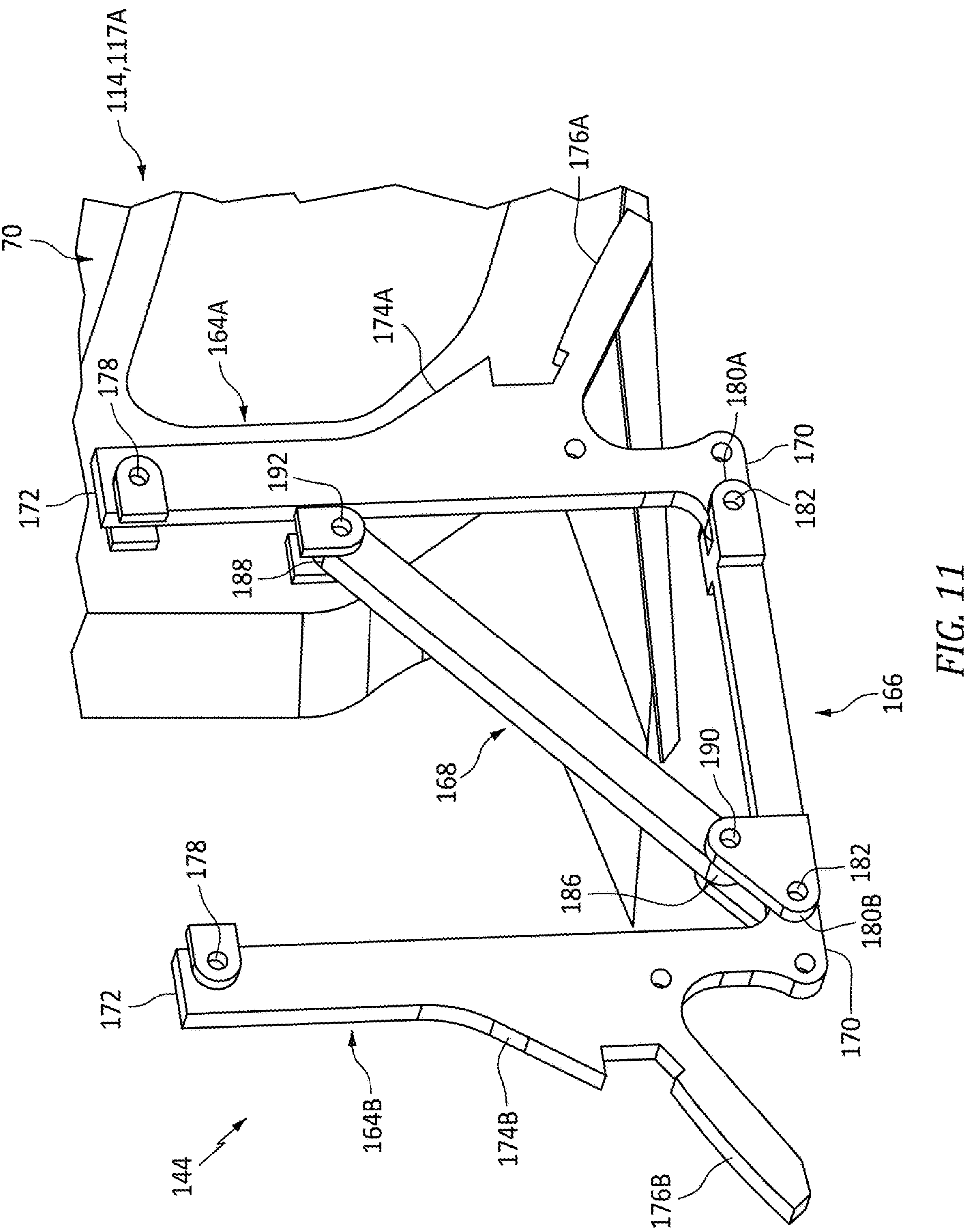
FIG. 11 is a perspective illustration of a portion of the nacelle inner structure with a mounting truss.

Referring to FIG. 11, the mounting truss 144 includes a set of bifurcation brackets 164A and 164B (generally referred to as "164") arranged laterally to the opposing lateral sides of the stationary structure 90 (see FIG. 7). The mounting truss 144 of FIG. 11 also includes a lateral linkage 166 and/or a diagonal linkage 168.

Each bifurcation bracket 164 extends radially from a radial inner end 170 of the respective bifurcation bracket 164 to a radial outer end 172 of the respective bifurcation bracket 164. At an exterior side of each bifurcation bracket 164, the bifurcation bracket 164 includes one or more bifurcation lands 174A, 174B (generally referred to as "174") and 176A, 176B (generally referred to as "176"). Each of these bifurcation lands 174 and 176 is configured to engage (e.g., abut against, contact, etc.) the back side of a respective one of the bifurcation sections 117. Each bifurcation section 117 is also fixedly attached to the respective bifurcation bracket 164 at the respective bifurcation lands 174 and 176. Each bifurcation section 117, for example, may be mechanically fastened (e.g., riveted, bolted, etc.) and/or bonded (e.g., welded, brazed, adhered, etc.) to one or all of the respective bifurcation lands 174 and 176. Referring to FIG. 7, the bifurcation bracket 164 is also attached to the stationary structure 90, thereby providing a coupling between the bifurcation 114 and each of its bifurcation sections 117 and the stationary structure 90. More particularly, each bifurcation bracket 164 of FIG. 7 is pivotally attached to the stationary structure 90 through a bifurcation pivot connection 178 (e.g., a single pin connection via a spherical or plain bearing arrangement) at the bifurcation bracket outer end 172. This pinned connection may translate axially along the axis of the pin, which axial translation may be in the direction of the axis 26.

Figure 12:
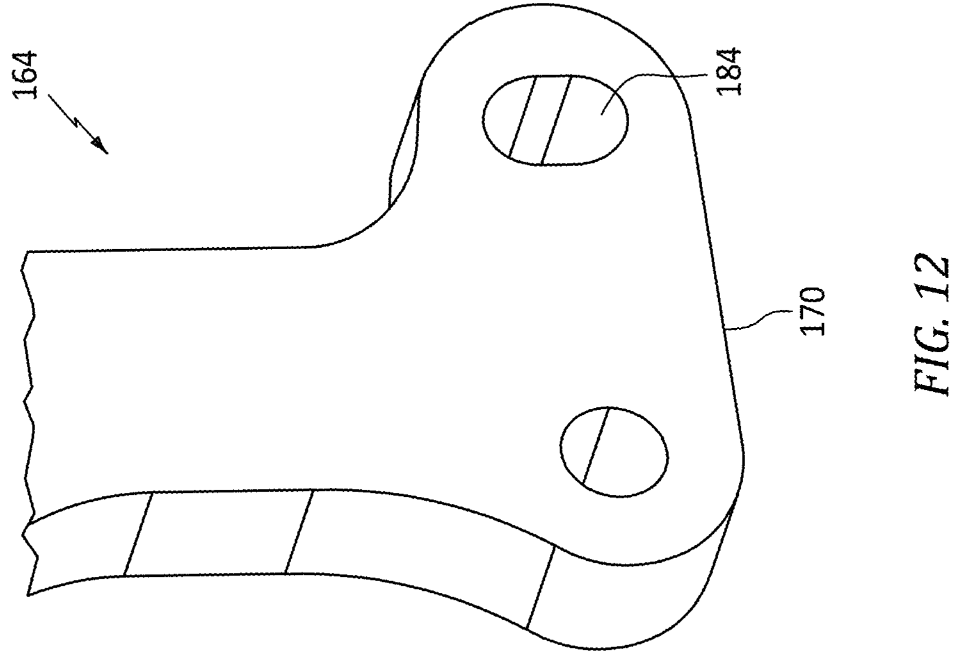
FIG. 12 is a perspective illustration of an inner end portion of a bifurcation bracket.

The lateral linkage 166 of FIG. 11 extends laterally between opposing lateral ends 180A and 180B (generally referred to as "180") of the lateral linkage 166. This lateral linkage 166 is attached to the bifurcation brackets 164 at their respective bifurcation bracket inner ends 170. The lateral linkage 166 of FIG. 11, for example, is pivotally attached to each bifurcation bracket 164 through a lateral linkage pivot connection 182 (e.g., a single pin connection) at the respective lateral linkage end 180. The lateral linkage 166 of FIG. 11 thereby laterally ties the bifurcation brackets 164 together. However, referring to FIG. 12, an aperture 184 (see FIG. 11) in each bifurcation bracket 164 for the respective lateral linkage pivot connection 182 may be radially elongated; e.g., the aperture 184 may be a radial slot. The lateral linkage 166 of FIG. 11 may thereby be operable to (e.g., slightly) shift radially relative to the bifurcation brackets 164.

The diagonal linkage 168 extends diagonally (e.g., radially and laterally) from a radial inner end 186 of the diagonal linkage 168 and a radial outer end 188 of the diagonal linkage 168. This diagonal linkage 168 is attached to the lateral linkage 166 at or near a first one of the lateral linkage ends (e.g., 180B); e.g., next to or near a first one of the bifurcation brackets (e.g., 164B). The diagonal linkage 168 of FIG. 11, for example, is pivotally attached to the lateral linkage 166 through an inner diagonal linkage pivot connection 190 (e.g., a single pin connection) at the diagonal linkage inner end 186. The diagonal linkage 168 is pivotally attached to the stationary structure 90 through an outer diagonal linkage pivot connection 192 (e.g., a single pin connection) at the diagonal linkage outer end 188. Here, the diagonal linkage outer end 188 is located next to or near the second one of the bifurcation brackets (e.g., 164A).

Referring to FIG. 8, each bifurcation section 117 is mounted to the inner engine case 66 through its respective bifurcation V-blade coupling 146. The bifurcation V-blade coupling 146 of FIG. 8 includes a blade 194 connected to the respective bifurcation section 117 and a channeled member 196 connected to the inner engine case 66. Each of these bifurcation V-blade coupling members 194 and 196 extends circumferentially about the axis along the respective bifurcation section 117 and the inner engine case 66. The blade 194 is mated with a channel in the channeled member 196 such that the blade 194 projects radially into the channel. With this arrangement, while the blade 194 may (e.g., slightly) move circumferentially and/or radially relative to the channeled member 196, the blade 194 is substantially axially fixed to the channeled member 196.

With the bifurcation mounting structure 140 of FIGS. 7 and 8, each bifurcation section 117 is mounted to and supported by both the stationary structure 90 and the inner engine case 66. The bifurcation mounting structure 140 of FIG. 7 provides a load path between each bifurcation section 117 and the stationary structure 90. The bifurcation mounting structure 140 of FIGS. 7 and 8 also accommodates (e.g., slight) deflections between the stationary structure 90 and the inner engine case 66 during aircraft propulsion system operation. This may facilitate a reduction in potential gaps between the bifurcation sections 117 and the inner barrel sections 116 due to deflections between the stationary structure 90 and the inner engine case 66.

Figure 13:
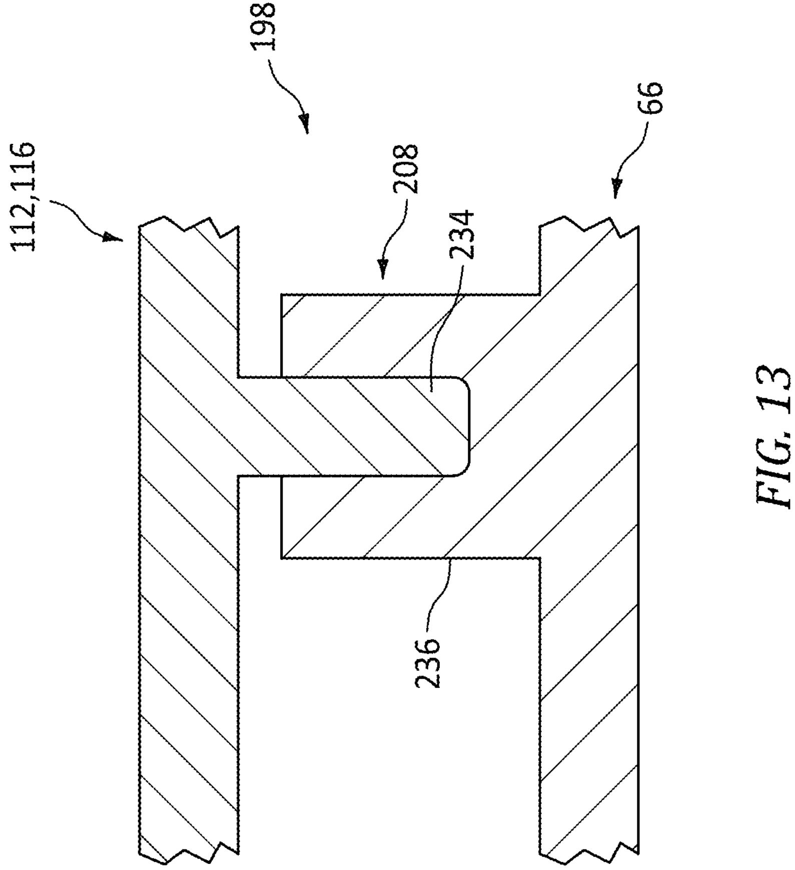
FIG. 13 is a partial sectional illustration of a V-blade coupling between an inner barrel section and the inner engine case.

Referring to FIG. 7, the inner barrel 112 and each of its inner barrel sections 116 is mounted with the aircraft propulsion system using an inner barrel mounting structure 198; e.g., an inner barrel mounting structure. This inner barrel mounting structure 198 is configured to mount the inner barrel 112 and each of its inner barrel sections 116 to the stationary structure 90 as well as the inner engine case 66 (see FIG. 13). The inner barrel mounting structure 198 of FIG. 7 includes a set of yoke hinge assemblies 200A and 200B (generally referred to as "200") and a set of bracket hinge assemblies 202A and 202B (generally referred to as "202"). The inner barrel mounting structure 198 of FIG. 7 may also include a crossbar hinge assembly 204 and/or a bumper structure 206 (partially shown in FIG. 7; see also FIGS. 14 and 15). The crossbar hinge assembly 204 may be axially aft of the yoke hinge assemblies 200 and the bracket hinge assemblies 202 along the axis 26. The bumper structure 206 may be axially between the yoke hinge assemblies 200 and the bracket hinge assemblies 202 along the axis 26. Referring to FIG. 13, the inner barrel mounting structure 198 may also include an inner barrel V-blade coupling 208 (or other tongue and groove coupling) for each inner barrel section 116. Each inner barrel V-blade coupling 208 may be axially forward of the other mounting structure members 200, 202 and 204 along the axis 26 (see FIG. 7).

Each yoke hinge assembly 200 of FIG. 7 includes a yoke-to-inner barrel hinge 210A and 210B (generally referred to as "210") and a yoke-to-hinge linkage 212A and 212B (generally referred to as "212"). Each yoke-to-inner barrel hinge 210 is fixedly attached to a respective one of the inner barrel sections 116. Each inner barrel sections 116, for example, may be mechanically fastened (e.g., riveted, bolted, etc.) and/or bonded (e.g., welded, brazed, adhered, etc.) to the respective yoke-to-inner barrel hinge 210. Each yoke-to-hinge linkage 212 extends laterally between and is pivotally attached to the respective yoke-to-inner barrel hinge 210 and the mounting yoke 142 at its yoke inner end 148. Each yoke-to-hinge linkage 212 thereby movably couples the respective yoke-to-inner barrel hinge 210 to the mounting yoke 142. With this arrangement, each inner barrel section 116 is laterally tied to the mounting yoke 142. Each inner barrel section 116, however, may (e.g., slightly) shift axially and/or radially relative to the mounting yoke 142.

Each bracket hinge assembly 202 of FIG. 7 includes a bracket-to-inner barrel hinge 214A and 214B (generally referred to as "214") and a bracket-to-hinge linkage 216A and 216B (generally referred to as "216"). Each bracket-to-inner barrel hinge 214 is fixedly attached to a respective one of the inner barrel sections 116. Each inner barrel sections 116, for example, may be mechanically fastened (e.g., riveted, bolted, etc.) and/or bonded (e.g., welded, brazed, adhered, etc.) to the respective bracket-to-inner barrel hinge 214. Each bracket-to-hinge linkage 216 extends laterally between and is attached to the respective bracket-to-inner barrel hinge 214 and the respective bifurcation bracket 164 at its bifurcation bracket inner end 170. More particularly, each bracket-to-hinge linkage 216 may be pivotally attached to the respective bracket-to-inner barrel hinge 214. Each bracket-to-hinge linkage 216 may be attached to the respective bifurcation bracket 164 by one or more bracket pin connections 218; e.g., bolted connections. Each bracket-to-hinge linkage 216 thereby movably couples the respective bracket-to-inner barrel hinge 214 to the mounting truss 144 and its respective bifurcation bracket 164. With this arrangement, each inner barrel section 116 is laterally and radially tied to the mounting truss 144. Each inner barrel section 116, however, may (e.g., slightly) shift axially relative to the mounting truss 144.

In some embodiments, each connection 218 and/or 220 between the bracket-to-hinge linkage 216 and another respective member 164, 214 may be made through a spherical bearing to facilitate tailored relative movement between those components.

The crossbar hinge assembly 204 of FIG. 7 includes a set of linkage-to-inner barrel hinges 222A and 222B (generally referred to as "222") and a crossbar linkage 224. Each linkage-to-inner barrel hinge 222 is fixedly attached to a respective one of the inner barrel sections 116. Each inner barrel sections 116, for example, may be mechanically fastened (e.g., riveted, bolted, etc.) and/or bonded (e.g., welded, brazed, adhered, etc.) to the respective linkage-to-inner barrel hinge 222. Each crossbar linkage 224 extends laterally between and is pivotally attached to each of the linkage-to-inner barrel hinges 222. Each crossbar linkage 224 thereby movably couples the linkage-to-inner barrel hinges 222 together. However, the crossbar hinge assembly 204 and its crossbar linkage 224 is disengaged from and decoupled from the bifurcation 114 and the stationary structure 90. The crossbar hinge assembly 204 thereby laterally ties the inner barrel sections 116 together, but facilitates (e.g., slight) shifting between the inner barrel 112 and the bifurcation 114, the stationary structure 90 and/or the inner engine case 66.

Figure 14:
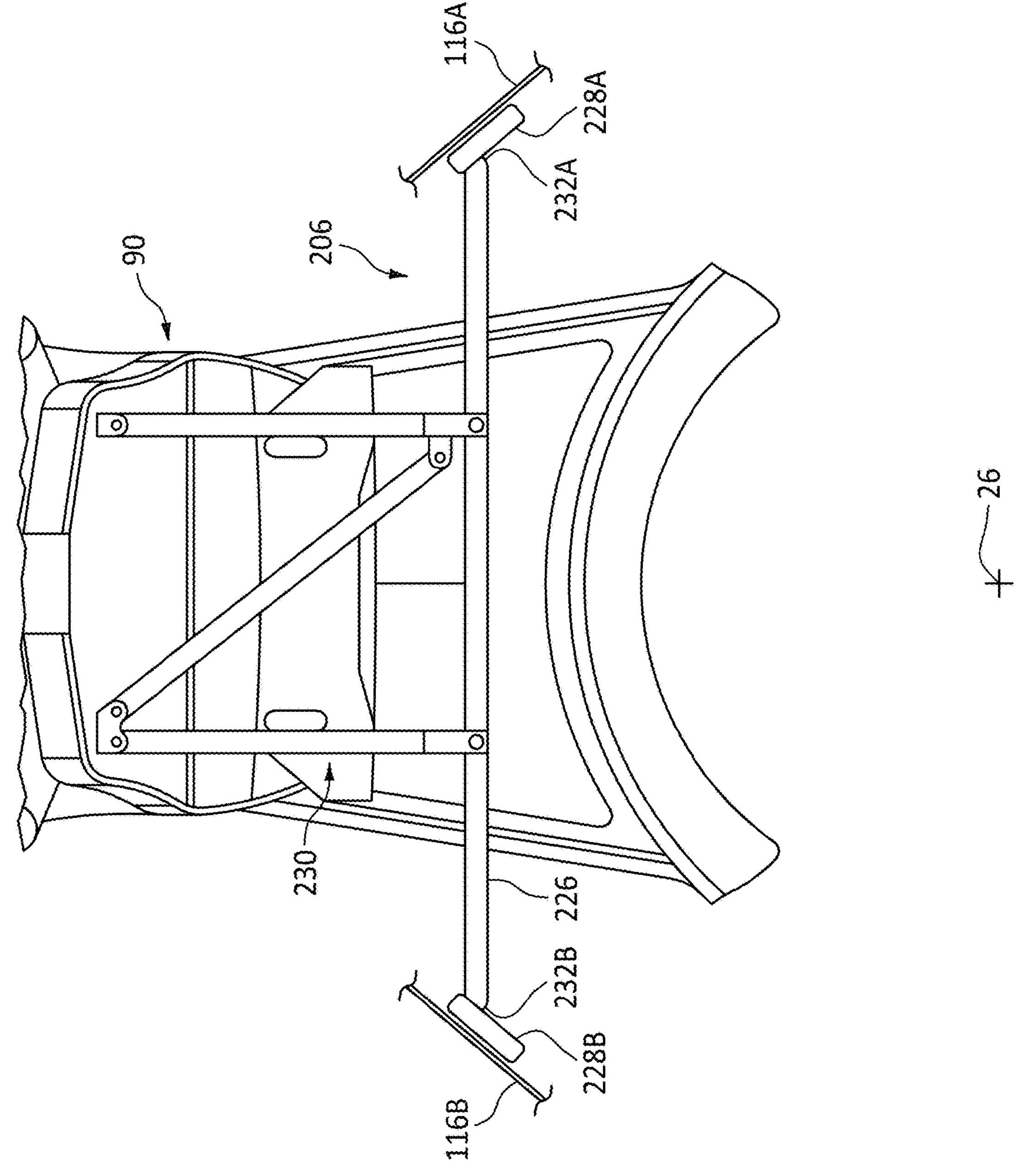
FIG. 14 is an end view illustration of a bumper structure mounted to a pylon structure.
Figure 15:
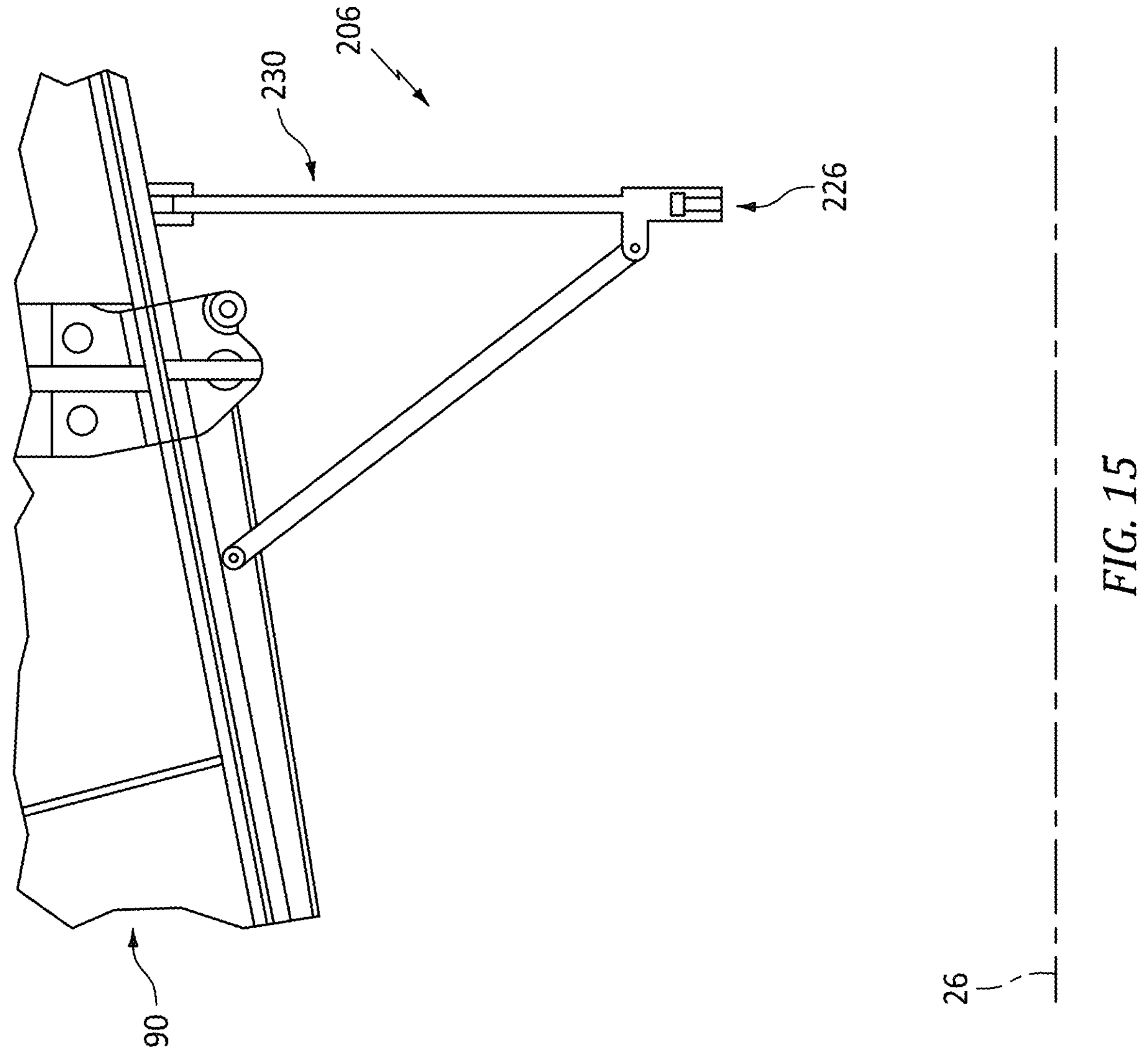
FIG. 15 is a partial side view illustration of the bumper structure mounted to the pylon structure.

The bumper structure 206 of FIGS. 14 and 15 includes a bumper rod 226 and a set of bumpers 228A and 228B (generally referred to as "228"). The bumper rod 226 is fixedly attached to the stationary structure 90. The bumper rod 226 of FIGS. 14 and 15, for example, is coupled to the stationary structure 90 through a truss system 230. This truss system 230 axially, radially and/or laterally ties the bumper rod 226 to the stationary structure 90. The bumper rod 226 of FIG. 14 extends laterally between opposing lateral ends 232A and 232B (generally referred to as "232"). Each bumper 228 is connected to the bumper rod 226 at a respective one of its bumper rod ends 232. Each bumper 228 is configured to engage (e.g., abut against, contact, etc.) a respective one of the inner barrel sections 116 when that inner barrel section 116 is in its closed position (e.g., see FIGS. 4 and 14). The bumper 228 may thereby prevent lateral and/or radial inward movement of the respective inner barrel section 116 at least at and about the location of the bumper 228. However, when the inner barrel section 116 is in its open position (e.g., see FIG. 5), each inner barrel section 116 may disengage from the respective bumper 228.

Referring to FIG. 13, each inner barrel section 116 is mounted to the inner engine case 66 through its respective inner barrel V-blade coupling 208. The inner barrel V-blade coupling 208 of FIG. 13 includes a blade 234 connected to the respective inner barrel section 116 and a channeled member 236 connected to the inner engine case 66. Each of these inner barrel V-blade coupling members 234 and 236 extends circumferentially about the axis along the respective inner barrel section 116 and the inner engine case 66. The blade 234 is mated with a channel in the channeled member 236 such that the blade 234 projects radially into the channel. With this arrangement, while the blade 234 may (e.g., slightly) move circumferentially and/or radially relative to the channeled member 236, the blade 234 is substantially axially fixed to the channeled member 236.

With the inner barrel mounting structure 198 of FIGS. 7 and 13, each inner barrel section 116 is mounted to and supported by both the stationary structure 90 and the inner engine case 66. The inner barrel mounting structure 198 of FIG. 7 provides a load path between each inner barrel section 116 and the stationary structure 90. The inner barrel mounting structure 198 of FIGS. 7 and 13 also accommodates (e.g., slight) deflections between the stationary structure 90 and the inner engine case 66 during aircraft propulsion system operation. This may further facilitate a reduction in potential gaps between the bifurcation sections 117 and the inner barrel sections 116 due to deflections between the stationary structure 90 and the inner engine case 66.

Figure 16:
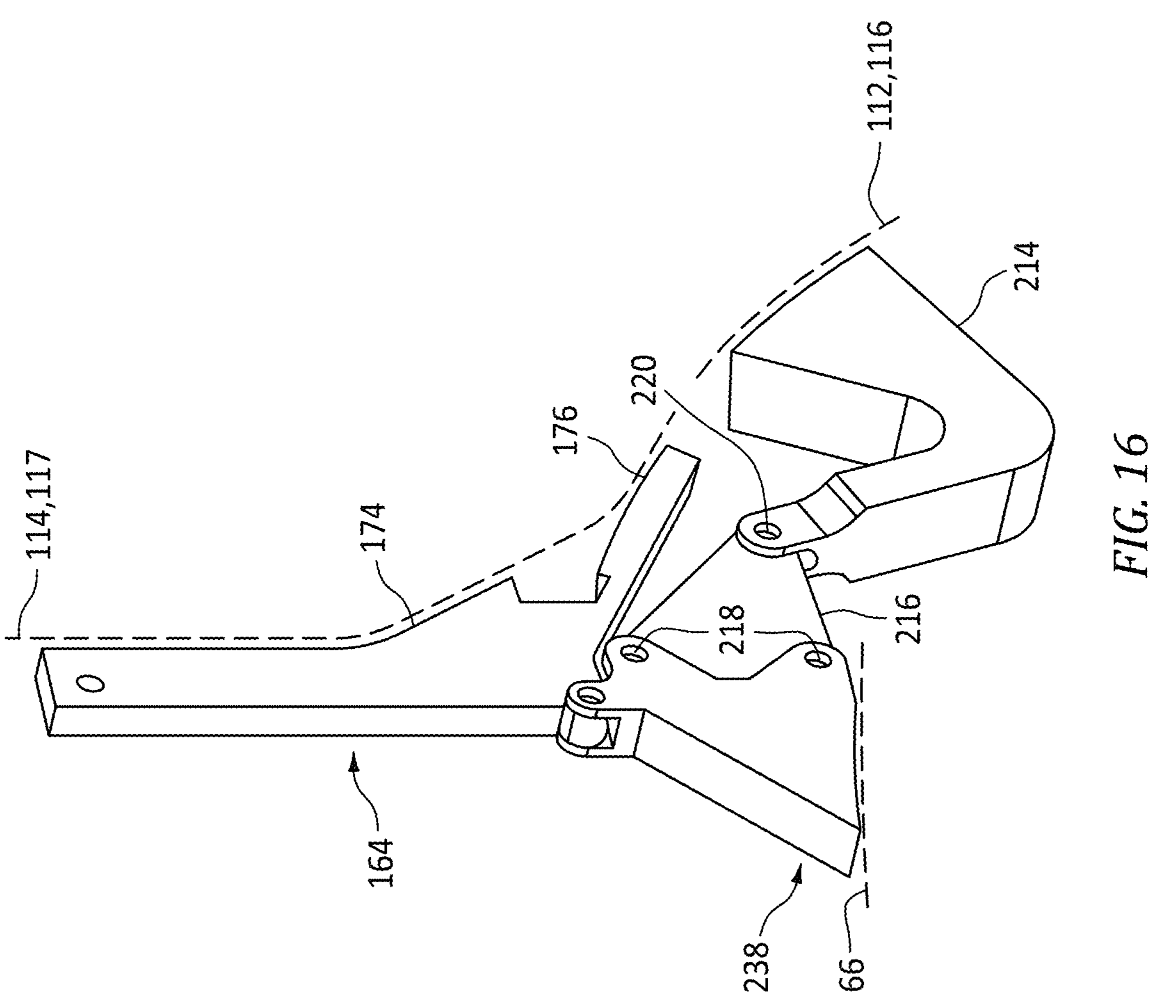
FIG. 16 is a perspective illustration of another mounting arrangement between the inner barrel section and the inner engine case.

In some embodiments, referring to FIG. 16, each bracket-to-inner barrel hinge 214 may be attached to a respective engine mount 238, rather than directly to the respective bifurcation bracket 164 as shown in FIG. 7. The bracket-to-inner barrel hinge 214 may thereby be laterally and radially tied to the inner engine case 66 rather than the mounting truss 144 as shown in FIG. 7. However, each engine mount 238 of FIG. 16 may be attached to the respective bifurcation bracket 164 through a moveable connection; e.g., a slotted connection. Each bifurcation bracket 164 of FIG. 16 may thereby be laterally and axially tied to the respective engine mount 238, but may (e.g., slightly) shift radially relative to the respective engine mount 238.

Figure 17:
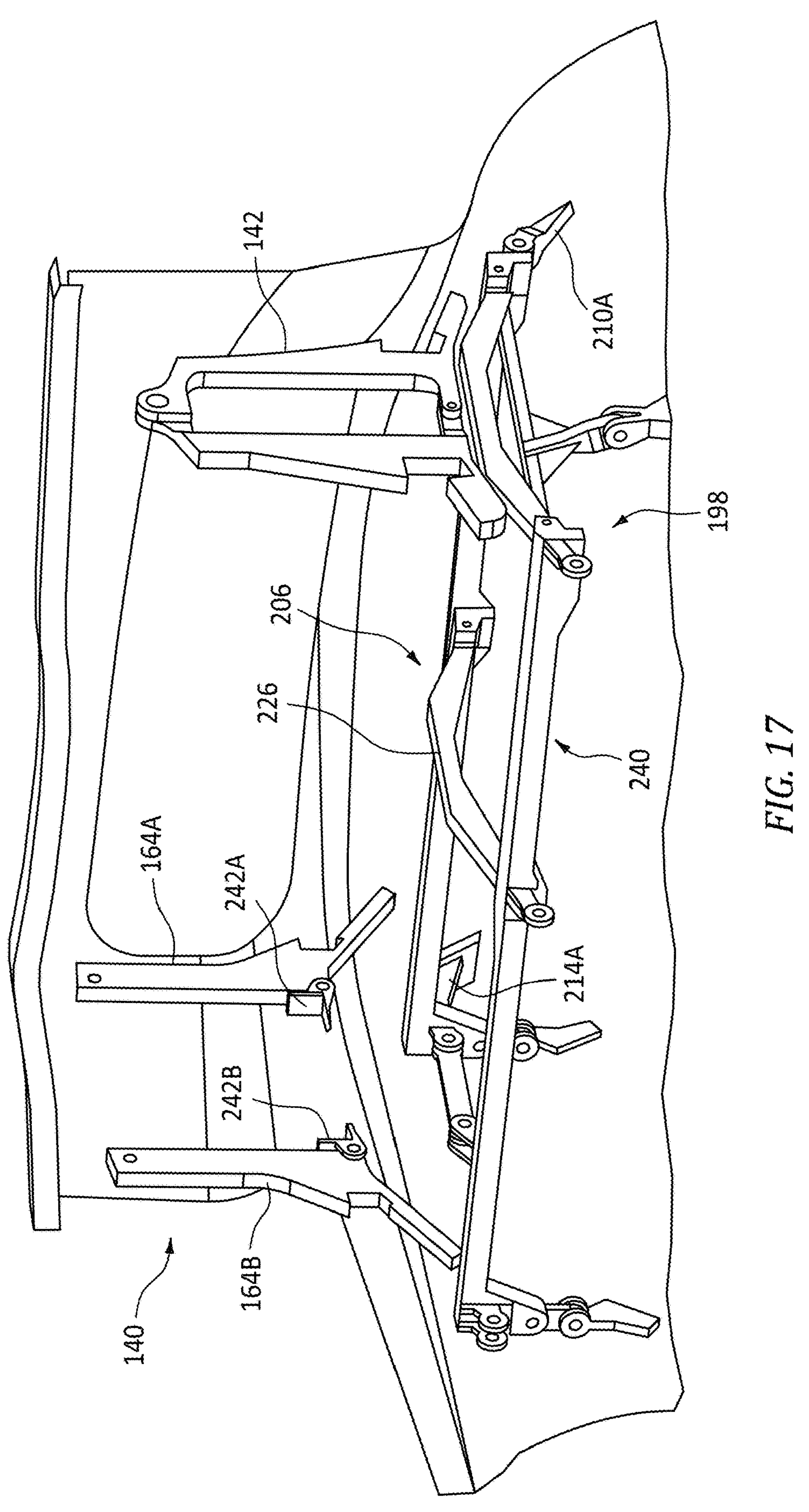
FIG. 17 is a perspective illustration of a portion of the nacelle inner structure with alternative mounting structures.

In some embodiments, referring to FIG. 17, the inner barrel mounting structure 198 may be structurally divorced from the bifurcation mounting structure 140. More particularly, the inner barrel mounting structure 198 may be decoupled and/or disengaged from the bifurcation mounting structure 140. The inner barrel mounting structure 198 may thereby be operable to move relative to the bifurcation mounting structure 140. For example, each of the hinges (e.g., 210, 214) may be pivotally attached to a frame 240 mounted to the inner engine case 66 (not visible in FIG. 17). The bumper rod 226 may also be integrated into the frame 240. To support the bifurcation brackets 164 at their inner ends, each bifurcation bracket 164 of FIG. 17 is mounted to the stationary structure 90 (not visible in FIG. 17) through a mounting bracket 242A, 242B (generally referred to as "242"). The coupling between each bifurcation bracket 164 and the respective mounting bracket 242 may include a slotted connection to facilitate radial movement between those components.

While various embodiments of the present invention have been disclosed, it will be apparent to those of ordinary skill in the art that many more embodiments and implementations are possible within the scope of the invention. For example, the present invention as described herein includes several aspects and embodiments that include particular features. Although these features may be described individually, it is within the scope of the present invention that some or all of these features may be combined with any one of the aspects and remain within the scope of the invention. Accordingly, the present invention is not to be restricted except in light of the attached claims and their equivalents.

What is claimed is:

1. An assembly for an aircraft propulsion system, comprising:

a pylon structure extending axially along an axis;

a nacelle inner barrel extending axially along and circumferentially about the axis, the nacelle inner barrel includes a first inner barrel section and a second inner barrel section;

a nacelle outer structure extending axially along and circumferentially about the nacelle inner barrel;

a bifurcation including a first bifurcation section and a second bifurcation section, the first bifurcation section disposed to a first side of the pylon structure, the second bifurcation section disposed to a second side of the pylon structure that is circumferentially opposite to the first side of the pylon structure, and the first bifurcation section and the second bifurcation section each projecting radially out from the nacelle inner barrel to the nacelle outer structure;

a mounting yoke including a first yoke bracket and a second yoke bracket, the first yoke bracket and the second yoke bracket each pivotally attached to the pylon structure by a yoke pivot connection at a radial outer end of the mounting yoke, the first bifurcation section fixedly attached to the first yoke bracket at a first side of the mounting yoke, and the second bifurcation section fixedly attached to the second yoke bracket at a second side of the mounting yoke that is circumferentially opposite to the second side of the mounting yoke; and a bypass flowpath extending radially between and formed by the nacelle inner barrel and the nacelle outer structure, the bifurcation extending radially across and circumferentially bifurcating the bypass flowpath;

wherein the mounting yoke, the first inner barrel section and the second inner barrel section are operable to collectively pivot together about the yoke pivot connection.

2. The assembly of claim 1, wherein the bypass flowpath extends circumferentially about the axis and circumferentially along the nacelle inner barrel and the nacelle outer structure from the first bifurcation section to the second bifurcation section.

3. The assembly of claim 1, further comprising:

a gas turbine engine including a case, a compressor section, a combustor section and a turbine section, the case housing the compressor section, the combustor section and the turbine section;

the nacelle inner barrel extending axially along and circumferentially about the case;

the pylon structure mounted to the case;

the first bifurcation section axially fixed to the case through a first V-blade coupling; and the second bifurcation section axially fixed to the case through a second V-blade coupling.

4. The assembly of claim 1, wherein the first yoke bracket and the second yoke bracket are bolted together at a radial inner end of the mounting yoke.

5. The assembly of claim 1, further comprising a first yoke-to-inner barrel hinge fixedly attached to the first inner barrel section and movably coupled to the mounting yoke at a radial inner end of the mounting yoke; and a second yoke-to-inner barrel hinge fixedly attached to the second inner barrel section and movably coupled to the mounting yoke at the radial inner end of the mounting yoke.

6. The assembly of claim 5, further comprising:

a first yoke-to-hinge linkage extending between and pivotally attached to the first yoke-to-inner barrel hinge and the mounting yoke; and a second yoke-to-hinge linkage extending between and pivotally attached to the second yoke-to-inner barrel hinge and the mounting yoke.

7. The assembly of claim 1, further comprising:

a first bifurcation bracket pivotally attached to the pylon structure by a first bifurcation bracket pivot connection at a radial outer end of the first bifurcation bracket, the first bifurcation section fixedly attached to the first bifurcation bracket; and a second bifurcation bracket pivotally attached to the pylon structure by a second bifurcation bracket pivot connection at a radial outer end of the second bifurcation bracket, the second bifurcation section fixedly attached to the second bifurcation bracket.

8. The assembly of claim 7, wherein the bifurcation extends axially from an upstream end of the bifurcation to a downstream end of the bifurcation; and the first bifurcation bracket and the second bifurcation bracket are each axially spaced from the mounting yoke towards the downstream end of the bifurcation.

9. The assembly of claim 7, further comprising:

a lateral linkage extending between a first end of the lateral linkage and a second end of the lateral linkage;

the lateral linkage pivotally attached to the first bifurcation bracket at the first end of the lateral linkage and a radial inner end of the first bifurcation bracket; and the lateral linkage pivotally attached to the second bifurcation bracket at the second end of the lateral linkage and a radial inner end of the second bifurcation bracket.

10. The assembly of claim 9, further comprising:

a diagonal linkage extending between a radial inner end of the diagonal linkage and a radial outer end of the diagonal linkage;

the diagonal linkage pivotally attached to the lateral linkage at the radial inner end of the diagonal linkage and the first end of the lateral linkage; and the diagonal linkage pivotally attached to the pylon structure at the radial outer end of the diagonal linkage and towards the second bifurcation bracket.

11. The assembly of claim 7, wherein the nacelle inner barrel includes a first inner barrel section and a second inner barrel section, and the assembly further comprises:

a first bracket-to-inner barrel hinge fixedly attached to the first inner barrel section and movably coupled to the first bifurcation bracket at a radial inner end of the first bifurcation bracket; and a second bracket-to-inner barrel hinge fixedly attached to the second inner barrel section and movably coupled to the second bifurcation bracket at a radial inner end of the second bifurcation bracket.

12. The assembly of claim 11, further comprising:

a first bracket-to-hinge linkage pivotally attached to the first bracket-to-inner barrel hinge, the first bracket-to-hinge linkage attached to the first bifurcation bracket by a plurality of first bracket pin connections; and a second bracket-to-hinge linkage pivotally attached to the second bracket-to-inner barrel hinge, the second bracket-to-hinge linkage attached to the second bifurcation bracket by a plurality of second bracket pin connections.

13. The assembly of claim 1, further comprising:

a bumper structure fixedly attached to the pylon structure and decoupled from the bifurcation, the bumper structure comprising a first bumper and a second bumper;

the first bumper configured to abut against the first inner barrel section when the first inner barrel section is in a closed position, and the first bumper configured to disengage from the first inner barrel section when the first inner barrel section is in an open position; and the second bumper configured to abut against the second inner barrel section when the second inner barrel section is in a closed position, and the second bumper configured to disengage from the second inner barrel section when the second inner barrel section is in an open position.

14. The assembly of claim 1, further comprising a crossbar linkage extending between a first end of the crossbar linkage and a second end of the crossbar linkage;

a first linkage-to-inner barrel hinge fixedly attached to the first inner barrel section and pivotally coupled to the crossbar linkage at the first end of the crossbar linkage; and a second linkage-to-inner barrel hinge fixedly attached to the second inner barrel section and pivotally coupled to the crossbar linkage at the second end of the crossbar linkage.

15. The assembly of claim 14, wherein the crossbar linkage is decoupled from and disengaged from the pylon structure and the bifurcation.

16. The assembly of claim 1, further comprises a gas turbine engine including a case, a compressor section, a combustor section and a turbine section, the case housing the compressor section, the combustor section and the turbine section;

the nacelle inner barrel extending axially along and circumferentially about the case;

the pylon structure mounted to the case;

the first inner barrel section axially fixed to the case through a first V-blade coupling; and the second inner barrel section axially fixed to the case through a second V-blade coupling.

17. An assembly for an aircraft propulsion system, comprising:

a pylon structure extending axially along an axis;

a nacelle inner barrel including a first inner barrel section and a second inner barrel section, the first inner barrel section disposed to a first side of the pylon structure, the second inner barrel section disposed to a second side of the pylon structure that is circumferentially opposite to the first side of the pylon structure, and the first inner barrel section and the second inner barrel section each extending axially along and circumferentially about the axis;

a nacelle outer structure extending axially along and circumferentially about the nacelle inner barrel;

a bypass flowpath extending radially between and formed by the nacelle inner barrel and the nacelle outer structure;

a bifurcation projecting radially out from the nacelle inner barrel across the bypass flowpath to the nacelle outer structure and circumferentially bifurcating the bypass flowpath, the bifurcation radially and axially covering the pylon structure, and the bifurcation including a first bifurcation section and a second bifurcation section; and a mounting yoke pivotally attached to the pylon structure by a yoke pivot connection at a radial outer end of the mounting yoke, the first bifurcation section and the second bifurcation section attached to circumferentially opposing sides of the mounting yoke;

a first yoke-to-inner barrel hinge fixedly attached to the first inner barrel section and movably coupled to the mounting yoke at a radial inner end of the mounting yoke; and a second yoke-to-inner barrel hinge fixedly attached to the second inner barrel section and movably coupled to the mounting yoke at the radial inner end of the mounting yoke;

wherein the mounting yoke, the first inner barrel section and the second inner barrel section are operable to collectively pivot together about the yoke pivot connection.

* * * * *